US012596311B2

(12) United States Patent
Kobayashi et al.

(10) Patent No.: US 12,596,311 B2
(45) Date of Patent: Apr. 7, 2026

(54) ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventors: Hiroko Kobayashi, Kanagawa (JP); Tomoya Sasaki, Kanagawa (JP); Kohei Hashimoto, Kanagawa (JP); Ryosuke Fujii, Kanagawa (JP); Yuto Okazaki, Kanagawa (JP); Kosuke Narita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 464 days.

(21) Appl. No.: 18/180,810

(22) Filed: Mar. 8, 2023

(65) Prior Publication Data

US 2023/0288847 A1 Sep. 14, 2023

(30) Foreign Application Priority Data

Mar. 11, 2022 (JP) ................................ 2022-038628

(51) Int. Cl.

*G03G 5/04* (2006.01)
*G03G 5/047* (2006.01)
(Continued)

(52) U.S. Cl.

CPC ............... *G03G 5/04* (2013.01); *G03G 5/047* (2013.01); *G03G 5/056* (2013.01); *G03G 5/0592* (2013.01);
(Continued)

(58) Field of Classification Search

CPC ............... G03G 5/047; G03G 5/06145; G03G 5/06142; G03G 5/056; G03G 5/0668;
(Continued)

(56) References Cited

U.S. PATENT DOCUMENTS

| | | | |
|---|---|---|---|
| 10,539,888 | B2 | 1/2020 | Kaku et al. |
| 11,106,147 | B2 | 8/2021 | Kudoh |

(Continued)

FOREIGN PATENT DOCUMENTS

| | | |
|---|---|---|
| JP | 2000010320 | 1/2000 |
| JP | 2004212562 | 7/2004 |

(Continued)

*Primary Examiner* — Mark F. Huff
*Assistant Examiner* — Boone Alexander Evans
(74) *Attorney, Agent, or Firm* — JCIPRNET

(57) ABSTRACT

An electrophotographic photoreceptor includes a conductive substrate, and a lamination type photosensitive layer disposed on the conductive substrate and including a charge generation layer and a charge transport layer in this order, in which the charge transport layer contains at least one resin selected from a polyester resin or a polycarbonate resin, and in a case where a Martens hardness and an indentation hardness, which are acquired by an indentation test performed on the charge transport layer to a depth of 0.5 μm, are respectively defined as HM ($N/mm^2$) and nIT ($N/mm^2$), Relational Equation (0) is satisfied, an elastic deformation modulus is 45% or greater and 70% or less, and a tensile elastic modulus of the charge transport layer is 2,300 MPa or greater and 5,000 MPa or less, $$nIT = a \times HM - b \quad (a = 2 \pm 0.2, b = 100 \pm 20). \qquad (0)$$

14 Claims, 3 Drawing Sheets

(51) Int. Cl.

| | |
|---|---|
| ***G03G 5/05*** | (2006.01) |
| ***G03G 5/07*** | (2006.01) |
| ***G03G 15/01*** | (2006.01) |
| ***G03G 15/02*** | (2006.01) |

(52) U.S. Cl.
CPC ............. *G03G 5/0596* (2013.01); *G03G 5/07* (2013.01); *G03G 15/0121* (2013.01); *G03G 15/0233* (2013.01)

(58) Field of Classification Search
CPC ............. G03G 5/0672; G03G 9/08733; G03G 15/0121; G03G 15/0233; G03G 5/04; G03G 5/0592; G03G 5/0596; G03G 5/07
See application file for complete search history.

(56) References Cited

U.S. PATENT DOCUMENTS

| | | | | |
|---|---|---|---|---|
| 2010/0239317 | A1 | 9/2010 | Motomura | |
| 2014/0011127 | A1 * | 1/2014 | Nakamura | G03G 5/0651 399/159 |

FOREIGN PATENT DOCUMENTS

| | | |
|---|---|---|
| JP | 2010217598 | 9/2010 |
| JP | 2013097300 | 5/2013 |
| JP | 2019012141 | 1/2019 |
| JP | 2019035900 | 3/2019 |
| JP | 2021015223 | 2/2021 |
| JP | 2021071565 | 5/2021 |
| JP | 2021117377 | 8/2021 |

* cited by examiner

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-038628 filed Mar. 11, 2022.

BACKGROUND

(i) Technical Field

The present invention relates to an electrophotographic photoreceptor, a process cartridge, and an image forming apparatus.

(ii) Related Art

JP2000-010320A discloses an electrophotographic photoreceptor, in which a surface coating film hardness test is performed on a surface layer of the electrophotographic photoreceptor in an environment of 25° C. and a humidity of 50%, a universal hardness value (Hu) obtained by the test satisfies 230 $N/mm^2 \leq Hu \leq 700$ $N/mm^2$, and a plastic deformation modulus of the surface layer measured by an indenter used for the surface coating film hardness test satisfies a specific formula.

JP2010-217598A discloses an image forming unit including a photoreceptor, in which an outermost surface layer has a Martens hardness value of 175 to 196 $N/mm^2$, an elastic deformation modulus of 35% to 48%, and a static friction coefficient of 0.535 or less.

JP2004-212562A discloses an electrophotographic photoreceptor, in which an outermost layer of the electrophotographic photoreceptor contains at least a thermoplastic resin and inorganic particles having a volume average particle diameter of 0.01 to 2.0 μm, a universal hardness (Hu) acquired by a surface coating film hardness test performed on the outermost layer in an environment of 25° C. and a humidity of 50% satisfies 220 $N/mm^2 \leq Hu \leq 400$ $N/mm^2$, and a plastic deformation modulus of the outermost layer measured by an indenter used for the surface coating film hardness test satisfies a specific formula.

SUMMARY

Aspects of non-limiting embodiments of the present disclosure relate to an electrophotographic photoreceptor capable of suppressing filming while maintaining low abrasiveness as compared with a case where an electrophotographic photoreceptor includes a lamination type photosensitive layer or a single layer type photosensitive layer and in a case where a Martens hardness HM ($N/mm^2$) and an indentation hardness nIT ($N/mm^2$) satisfy Relational Equation (0), an elastic deformation modulus is less than 45% or greater than 70% or a tensile elastic modulus is less than 2,300 MPa or greater than 5,000 MPa.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above-described object includes the following aspects.

According to an aspect of the present disclosure, there is provided an electrophotographic photoreceptor including: a conductive substrate; and a lamination type photosensitive layer disposed on the conductive substrate and including a charge generation layer and a charge transport layer in this order, in which the charge transport layer contains at least one resin selected from a polyester resin or a polycarbonate resin, and in a case where a Martens hardness and an indentation hardness, which are acquired by an indentation test performed on the charge transport layer to a depth of 0.5 μm, are respectively defined as HM ($N/mm^2$) and nIT ($N/mm^2$), Relational Equation (0) is satisfied, an elastic deformation modulus is 45% or greater and 70% or less, and a tensile elastic modulus of the charge transport layer is 2,300 MPa or greater and 5,000 MPa or less, $$nIT = a \times HM - b\,(a = 2 \pm 0.2, b = 100 \pm 20). \qquad (0)$$

BRIEF DESCRIPTION OF THE DRAWINGS

Exemplary embodiment(s) of the present invention will be described in detail based on the following figures, wherein.

DETAILED DESCRIPTION

Figure 1:
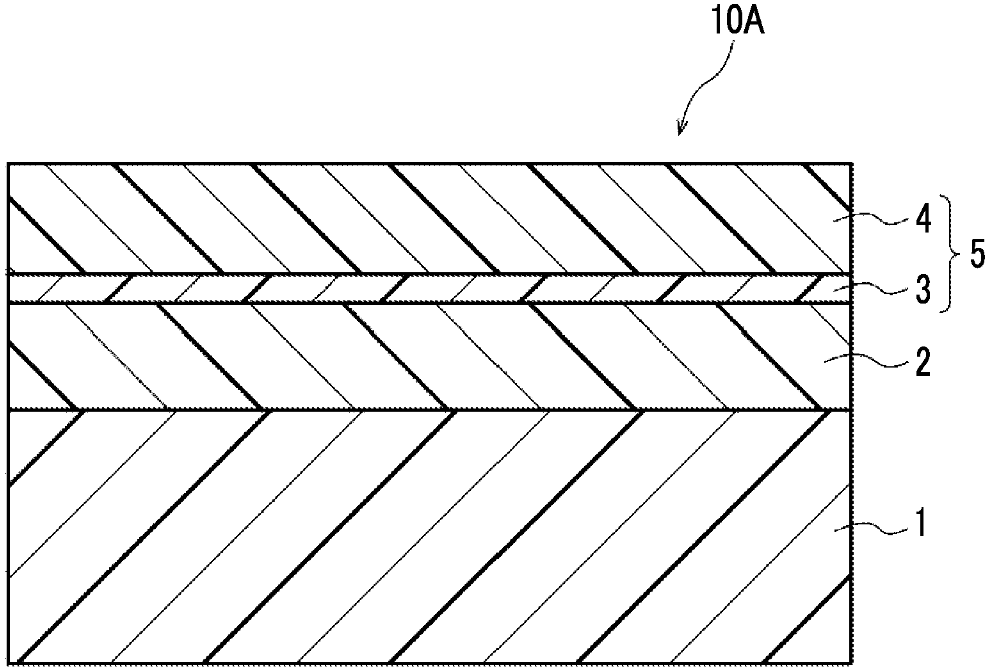
FIG. 1 is a partial cross-sectional view showing an example of a layer configuration of an electrophotographic photoreceptor according to a first exemplary embodiment.

Hereinafter, exemplary embodiments of the present disclosure will be described. The following descriptions and examples merely illustrate the exemplary embodiments, and do not limit the scope of the exemplary embodiments.

In the present disclosure, a numerical range shown using "to" indicates a range including numerical values described before and after "to" as a minimum value and a maximum value.

In a numerical range described in a stepwise manner in the present disclosure, an upper limit value or a lower limit value described in a certain numerical range may be replaced with an upper limit value or a lower limit value in another numerical range described in a stepwise manner. Further, in a numerical range described in the present disclosure, an upper limit value or a lower limit value described in the numerical range may be replaced with a value shown in Examples.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition, unless otherwise specified.

In the present disclosure, the term "(meth)acryl" may denote any of "acryl" or "methacryl".

In the present disclosure, an alkyl group is any of linear, branched, or cyclic unless otherwise specified.

Electrophotographic Photoreceptor

The present disclosure provides a first exemplary embodiment and a second exemplary embodiment of an electrophotographic photoreceptor (hereinafter, also referred to as a "photoreceptor").

The photoreceptor according to the first exemplary embodiment includes a conductive substrate, and a lamination type photosensitive layer disposed on the conductive substrate and including a charge generation layer and a charge transport layer in this order. The photoreceptor according to the first exemplary embodiment may further include other layers (for example, an undercoat layer and an interlayer).

The photoreceptor according to the second exemplary embodiment includes a conductive substrate, and a single layer type photosensitive layer disposed on the conductive substrate. The photoreceptor according to the second exemplary embodiment may further include other layers (for example, an undercoat layer and an interlayer).

FIG. 1 is a partial cross-sectional view schematically showing an example of the layer configuration of the photoreceptor according to the first exemplary embodiment. A photoreceptor 10A shown in FIG. 1 includes a lamination type photosensitive layer. The photoreceptor 10A has a structure in which an undercoat layer 2, a charge generation layer 3, and a charge transport layer 4 are laminated in this order on a conductive substrate 1, and the charge generation layer 3 and the charge transport layer 4 constitute a photosensitive layer 5 (so-called function separation type photosensitive layer). The photoreceptor 10A may not be provided with the undercoat layer 2 or may further include an interlayer (not shown) between the undercoat layer 2 and the charge generation layer 3.

Figure 2:
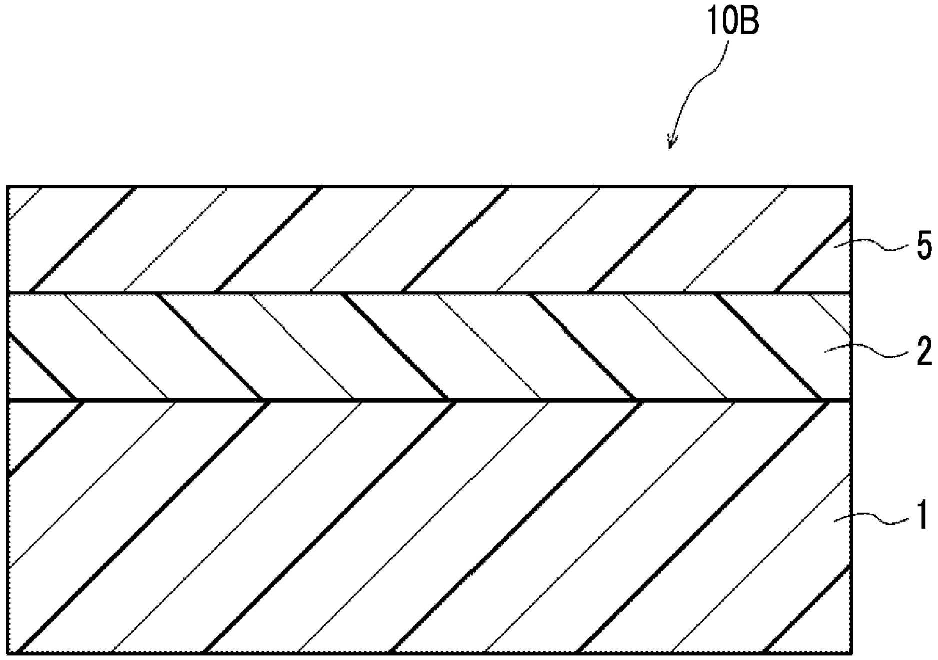
FIG. 2 is a partial cross-sectional view showing an example of a layer configuration of an electrophotographic photoreceptor according to a second exemplary embodiment.

FIG. 2 is a partial cross-sectional view schematically showing an example of the layer configuration of the photoreceptor according to the second exemplary embodiment. A photoreceptor 10B shown in FIG. 2 includes a single layer type photosensitive layer. The photoreceptor 10B has a structure in which the undercoat layer 2 and the photosensitive layer 5 are laminated in this order on the conductive substrate 1. The photoreceptor 10B may not be provided with the undercoat layer 2 or may further include an interlayer (not shown) between the undercoat layer 2 and the photosensitive layer 5.

In the photoreceptor according to the first exemplary embodiment, the charge transport layer contains at least one resin selected from a polyester resin or a polycarbonate resin, and in a case where a Martens hardness and an indentation hardness, which are acquired by an indentation test performed on the charge transport layer to a depth of 0.5 μm, are respectively defined as HM ($N/mm^2$) and nIT ($N/mm^2$), Relational Equation (0) is satisfied, an elastic deformation modulus is 45% or greater and 70% or less, and a tensile elastic modulus is 2,300 MPa or greater and 5,000 MPa or less.

$$nIT=a\times HM-b(a=2\pm 0.2,b=100\pm 20) \quad (0)$$

In the photoreceptor according to the second exemplary embodiment, the single layer type photosensitive layer contains at least one resin selected from a polyester resin or a polycarbonate resin, and in a case where a Martens hardness and an indentation hardness, which are acquired by an indentation test performed on the single layer type photosensitive layer to a depth of 0.5 μm, are respectively defined as HM ($N/mm^2$) and nIT ($N/mm^2$), Relational Equation (0) is satisfied, an elastic deformation modulus is 45% or greater and 70% or less, and a tensile elastic modulus is 2,300 MPa or greater and 5,000 MPa or less.

$$nIT=a\times HM-b(a=2\pm 0.2,b=100\pm 20) \quad (0)$$

The photoreceptor according to the first exemplary embodiment and the photoreceptor according to the second exemplary embodiment are capable of suppressing filming while maintaining low abrasiveness.

Here, the term "filming" denotes a streak-like coating film formed by a toner locally accumulating on the surface of the photoreceptor.

Hereinafter, in a case of description common to the first exemplary embodiment and the second exemplary embodiment, both exemplary embodiments are collectively referred to as the present exemplary embodiment. Further, hereinafter, the lamination type photosensitive layer according to the first exemplary embodiment and the single layer type photosensitive layer according to the second exemplary embodiment will be collectively simply referred to as "photosensitive layer".

Relational Equation (0) and Elastic Deformation Modulus

In the photoreceptor according to the present exemplary embodiment, in a case where the Martens hardness and the indentation hardness, which are acquired by an indentation test performed on the charge transport layer or the single layer type photosensitive layer to a depth of 0.5 are respectively defined as HM ($N/mm^2$) and nIT ($N/mm^2$), the elastic deformation modulus is 45% or greater and 70% or less in a case where Relational Equation (0) is satisfied.

$$nIT=a\times HM-b(a=2\pm 0.2,b=100\pm 20) \quad (0)$$

That is, in a case where the Martens hardness HM and the indentation hardness nIT that are acquired by the above-described indentation test satisfy Relational Equation (0) and the elastic deformation modulus in this case is 45% or greater and 70% or less, filming can be suppressed as compared with a case where the above-described conditions are not satisfied. The reason for this is assumed as follows.

The filming in the photoreceptor is caused by, for example, embedding of an external additive (for example, silica particles) of a toner in the surface of the photoreceptor. Specifically, in a case where one or a plurality of external additives are embedded in the surface of the photoreceptor, slightly recessed grooves are formed continuously along the circumferential direction of the photoreceptor. The external additive is easily accumulated in the recesses of the formed grooves, and a plurality of external additive pools are formed along the circumferential direction of the photoreceptor. In particular, since the external additive such as silica particles is a hard component, the hardness of the external additive pools is high, the size of the recesses in a region where the external additive pools are formed increases, and thus dent-like external additive pools are formed. In a case where the dent-like external additive pools are formed, the toner that cannot follow local roughness any longer starts accumulating in a layered manner, and the filming occurs.

As a result of confirmation performed on the surface of the photoreceptor in which the external additive of the toner has been embedded, which causes the occurrence of filming, it is found that plastic deformation and local deterioration of the surface shape occur in the surface of the photoreceptor.

Therefore, as a result of examination on embedding of the external additive, it is found that in a case where Relational Equation (0) using the Martens hardness HM and the indentation hardness nIT, which are physical property values acquired by performing an indentation test on the charge transport layer or the single layer type photosensitive layer to a depth of 0.5 μm, is derived and Relational Equation (0) is further satisfied, the elastic deformation modulus is 45% or greater and 70% or less.

That is, it is assumed that in a case where Relational Equation (0) is satisfied and the elastic deformation modulus under the condition that Relational Equation (0) is satisfied is 45% or greater and 70% or less, plastic deformation of the surface of the photoreceptor and local deterioration of the surface shape due to the external additive are suppressed, embedding of the external additive is suppressed, and thus filming can be suppressed.

Further, from the viewpoint of achieving both the abrasion resistance and the filming resistance, the Martens hardness HM is, for example, preferably 100 $N/mm^2$ or greater and 300 $N/mm^2$ or less and more preferably 120 $N/mm^2$ or greater and 240 $N/mm^2$ or less. The indentation hardness nIT is not limited as long as Relational Equation (0) is satisfied, but is, for example, preferably 150 $N/mm^2$ or greater and 600 $N/mm^2$ or less and more preferably 200 $N/mm^2$ or greater and 400 $N/mm^2$ or less.

Tensile Elastic Modulus

The photoreceptor according to the present exemplary embodiment has low abrasiveness as compared with a photoreceptor in which the tensile elastic modulus of the charge transport layer or the single layer type photosensitive layer is less than 2,300 MPa and is capable of suppressing filming as compared with a photoreceptor in which the tensile elastic modulus of the charge transport layer or the single layer type photosensitive layer is greater than 5000 MPa.

That is, the photoreceptor according to the present exemplary embodiment is capable of suppressing filming while maintaining low abrasiveness in a case where the tensile elastic modulus of the charge transport layer or the single layer type photosensitive layer is 2,300 MPa or greater and 5,000 MPa or less.

Exemplary Embodiment

It is preferable that the charge transport layer of the photoreceptor according to the first exemplary embodiment contains at least one resin selected from a polyester resin or a polycarbonate resin and the charge transport material and that, for example, Expressions (1) to (4) are satisfied in a case where a weight-average molecular weight Mw of the resin is defined as A (×10,000), the value of a ratio M1/M2 of a mass M1 of the charge transport material to a mass M2 of the charge transport layer is defined as Cs, and the average thickness of the charge transport layer is defined as Ds (μm).

$$5 \leq A \leq 40 \tag{1}$$

$$0.28 \leq Cs \leq 0.55 \tag{2}$$

$$27 \leq Ds \leq 50 \tag{3}$$

$$2.5 \leq (A \times Ds)/(Cs \times 100) \leq 70.0 \tag{4}$$

It is preferable that the single layer type photosensitive layer of the photoreceptor according to the second exemplary embodiment contains at least one resin selected from a polyester resin or a polycarbonate resin and the charge transport material and that, for example, Expressions (1) to (4) are satisfied in a case where a weight-average molecular weight Mw of the resin is defined as A (×10,000), the value of a ratio M1/M2 of a mass M1 of the charge transport material to a mass M2 of the single layer type photosensitive layer is defined as Ct, and the average thickness of the single layer type photosensitive layer is defined as Dt (μm).

$$5 \leq A \leq 40 \tag{1}$$

$$0.40 \leq Ct \leq 0.60 \tag{2}$$

$$27 \leq Dt \leq 50 \tag{3}$$

$$2.5 \leq (A \times Dt)/(Ct \times 100) \leq 48.0 \tag{4}$$

It is desirable that the charge transport layer of the photoreceptor according to the first exemplary embodiment satisfies, for example, Expression (4) 2.5≤(A×Ds)/(Cs×100) ≤70.0 in a case where the weight-average molecular weight Mw of at least one resin selected from a polyester resin or a polycarbonate resin is defined as A (×10,000), the value of a ratio M1/M2 of a mass M1 of the charge transport material to a mass M2 of the charge transport layer is defined as Cs, and the average thickness of the charge transport layer is defined as Ds (μm).

It is desirable that the single layer type photosensitive layer of the photoreceptor according to the second exemplary embodiment satisfies, for example, Expression (4) 2.5≤(A×Dt)/(Ct×100)≤48.0 in a case where the weight-average molecular weight Mw of at least one resin selected from a polyester resin or a polycarbonate resin is defined as A (×10,000), the value of a ratio M1/M2 of a mass M1 of the charge transport material to a mass M2 of the single layer type photosensitive layer is defined as Ct, and the average thickness of the single layer type photosensitive layer is defined as Dt (μm).

The reason why these are desired is assumed as follows. Further, at least one resin selected from the polyester resin or the polycarbonate resin will also be appropriately referred to as "specific resin" below.

In a case where the value of (A×Ds)/(Cs×100) or (A×Dt)/(Ct×100) is less than 2.5, since the weight-average molecular weight Mw of the specific resin, the average thickness Ds of the charge transport layer, or the average thickness Dt value of the single layer type photosensitive layer is extremely small or the value of the content ratio Cs or Ct of the charge transport material is extremely large (that is, the content ratio of the specific resin is extremely small), the abrasion resistance of the photosensitive layer is insufficient. From this viewpoint, the value of (A×Ds)/(Cs×100) and the value of (A×Dt)/(Ct×100) are each 2.5 or greater, for example, preferably 3.6 or greater, more preferably 7.2 or greater, and still more preferably 7.7 or greater.

In a case where the value of (A×Ds)/(Cs×100) is greater than 70.0 or the value of (A×Dt)/(Ct×100) is greater than 48.0, since the weight-average molecular weight Mw of the specific resin, the average thickness Ds of the charge transport layer, or the average thickness Dt value of the single layer type photosensitive layer is extremely large or the value of the content ratio Cs or Ct of the charge transport material is extremely small (that is, the content ratio of the specific resin is extremely large), the filming may occur. From this viewpoint, the value of (A×Ds)/(Cs×100) is 70.0 or less, for example, preferably 46.0 or less, more preferably 33.0 or less, and still more preferably 25.0 or less. From this viewpoint, the value of (A×Dt)/(Ct×100) is 48.0 or less, for example, preferably 40.0 or less, more preferably 27.0 or less, and still more preferably 20.0 or less.

In Regard to Expression (1)

In the photoreceptor according to the present exemplary embodiment, the specific resin contained in the charge transport layer and the specific resin contained in the single layer type photosensitive layer satisfy Expression (1) $5 \leq A \leq 40$ in a case where the weight-average molecular weight Mw is defined as A (×10,000). That is, the weight-average molecular weight Mw of at least one resin selected from the polyester resin or the polycarbonate resin is 50,000 or greater and 400,000 or less.

In a case where the value of A is less than 5, the strength of the charge transport layer or the single layer type photosensitive layer is decreased, and thus the abrasion resistance is degraded. From this viewpoint, the value of A is 5 or greater, for example, preferably 6 or greater, more preferably 7 or greater, and still more preferably 8 or greater.

In a case where the value of A is greater than 40, the viscosity of a coating solution for forming the charge transport layer or the single layer type photosensitive layer increases, and stable coating is unlikely to occur. In addition, the adhesiveness of the charge transport layer or the single layer type photosensitive layer to other layers is degraded, and thus filming is likely to occur or the charge transport layer or the single layer type photosensitive layer is likely to be peeled off. From this viewpoint, the value of A is 40 or less, for example, preferably 30 or less, more preferably 25 or less, and still more preferably 20 or less.

In Regard to Expression (2)

The charge transport layer of the photoreceptor according to the first exemplary embodiment satisfies Expression (2) $0.28 \leq Cs \leq 0.55$ in a case where the value of the ratio M1/M2 of the mass M1 of the charge transport material to the mass M2 of the charge transport layer is defined as Cs.

Further, the single layer type photosensitive layer of the photoreceptor according to the second exemplary embodiment satisfies Expression (2) $0.40 \leq Ct \leq 0.60$ in a case where the value of the ratio M1/M2 of the mass M1 of the charge transport material to the mass M2 of the single layer type photosensitive layer is defined as Ct.

In a case where the value of Cs is less than 0.28 or the value of Ct is less than 0.40, the content ratio of the charge transport material contained in the charge transport layer or the single layer type photosensitive layer is small, and thus the electrical properties are degraded. From this viewpoint, the value of Cs is 0.28 or greater, for example, preferably 0.31 or greater, more preferably 0.33 or greater, and still more preferably 0.34 or greater. From this viewpoint, the value of Ct is 0.40 or greater, for example, preferably 0.43 or greater, more preferably 0.44 or greater, and still more preferably 0.45 or greater.

In a case where the value of Cs is greater than 0.55 or the value of Ct is greater than 0.60, since the content ratio of the charge transport material contained in the charge transport layer or the single layer type photosensitive layer is extremely large (that is, the content ratio of the specific resin is extremely small), the strength of the charge transport layer or the single layer type photosensitive layer is decreased, and the abrasion resistance is degraded. From this viewpoint, the value of Cs is 0.55 or less, for example, preferably 0.50 or less, more preferably 0.48 or less, and still more preferably 0.46 or less. From this viewpoint, the value of Ct is 0.60 or less, for example, preferably 0.58 or less, more preferably 0.56 or less, and still more preferably 0.55 or less.

In Regard to Expression (3)

The photoreceptor according to the first exemplary embodiment satisfies Expression (3) $27 \leq Ds \leq 50$ in a case where the average thickness of the charge transport layer is defined as Ds (μm). That is, the average thickness Ds of the charge transport layer is 27 μm or greater and 50 μm or less.

Further, the photoreceptor according to the second exemplary embodiment satisfies Expression (3) $27 \leq Dt \leq 50$ in a case where the average thickness of the single layer type photosensitive layer is defined as Dt (μm). That is, the average thickness Dt of the single layer type photosensitive layer is 27 μm or greater and 50 μm or less.

In a case where the average thickness Ds and the average thickness Dt are 27 μm or greater, the abrasion allowance of the photoreceptor can be ensured and the life of the photoreceptor can be extended. From this viewpoint, the average thickness Ds and the average thickness Dt are 27 μm or greater, for example, preferably 31 μm or greater, more preferably 35 μm or greater, and still more preferably 37 μm or greater.

In a case where the average thickness Ds and the average thickness Dt are 50 μm or less, the electrical properties can be maintained both in the initial stage and after the abrasion. From this viewpoint, the average thickness Ds and the average thickness Dt are 50 μm or less, for example, preferably 48 μm or less, more preferably 46 μm or less, and still more preferably 45 μm or less.

Various Measurements

A method of measuring the Martens hardness HM and the indentation hardness nIT of the charge transport layer in the first exemplary embodiment is as follows.

First, a photoreceptor including a charge transport layer to be measured is set in a measuring device (PICODENTOR HM500, manufactured by Fischer Instruments K. K.) in an environment of a temperature of 23° C. and a humidity of 30% RH. Further, an indentation test is performed on the surface of the charge transport layer to a depth of 0.5 μm using a Berkovich indenter at an indentation speed of 25 μm/s, and the Martens hardness and the indentation hardness are acquired. In addition, an indentation curve (load curve) formed by an indentation depth (μm) and an indentation force (mN) is obtained by performing this test.

The Martens hardness is a value defined by the following equation based on the indentation depth.

$$\text{Martens hardness } (N/\text{mm}^2) = \text{test load } (N) / \text{surface area } (\text{mm}^2) \text{ of indenter under test load}$$

The indentation hardness is a value defined by an expression "amount of deformation (depth) of charge transport layer immediately after removal of load due to indentation–contact depth derived from tangent of load curve".

The measurement position is the apex in the circumferential direction of the photoreceptor, the measurement is performed at three sites at the center and both ends in one axis in a case where the circumferential direction is divided into four equal parts, and the average value of the measured values at the 12 sites is used as the physical property value.

In the second exemplary embodiment, the measurement is performed similarly by replacing “charge transport layer” with “single layer type photosensitive layer”.

The elastic deformation modulus of the charge transport layer in the first exemplary embodiment is acquired by the following equation.

$$\text{Elastic deformation modulus (\%)} = (1 - \text{strain depth}/\text{maximum indentation depth}) \times 100$$

Here, the strain depth denotes the amount of deformation that has not recovered due to the load, and is used as an index indicating the plastic deformation.

An increase in elastic deformation modulus denotes that deformation against the load is unlikely to remain, and an elastic deformation modulus of 100% denotes that no deformation remains.

The elastic deformation modulus is measured by a test with the same device under the same conditions as the device and the conditions for the Martens hardness HM and the indentation hardness nIT. In the measurement, the strain depth is obtained by acquiring the amount of deformation (depth) of the charge transport layer at the end of the measurement as the amount of deformation that has not recovered due to the load, and the maximum indentation depth is set to 0.5 μm, which is the indentation depth of a Berkovich indenter.

In the second exemplary embodiment, the measurement is performed similarly by replacing “charge transport layer” with “single layer type photosensitive layer”.

A method of measuring the tensile elastic modulus of the charge transport layer according to the first exemplary embodiment is as follows.

The charge transport layer is cut out from the photoreceptor to be measured, and a Dumbbell #3 punched test piece (width of 5 mm) is obtained. The average value of the values measured five times in the circumferential direction in conformity with JIS K 7127:1999 using a Dumbbell #3 punched test piece is defined as the tensile elastic modulus. Further, MODEL-1605N (manufactured by Aikoh Engineering Co., Ltd.) is used as the measuring device, and the tensile speed is set to 20 mm/min.

In the second exemplary embodiment, the measurement is performed similarly by replacing “charge transport layer” with “single layer type photosensitive layer”.

In the first exemplary embodiment, the method of measuring the weight-average molecular weight Mw and the number average molecular weight Mn of the specific resin contained in the charge transport layer is as follows.

The photoreceptor is immersed in various solvents (mixed solvents may be used), and the solvent in which the charge transport layer is dissolved is grasped. The photoreceptor is immersed in a solvent in which the charge transport layer is dissolved to extract the charge transport layer. The solution from which the charge transport layer is extracted is added dropwise to a poor solvent of the polyester resin or the polycarbonate resin (for example, a non-polar solvent such as hexane or toluene, or lower alcohol such as methanol or isopropanol, and a mixed solvent may be used as a poor solvent) to reprecipitate the resin. The reprecipitation treatment is repeated twice as necessary, and the resin that is a reprecipitate is vacuum-dried, thereby obtaining the polyester resin. The molecular weight of the polyester resin is measured by gel permeation chromatography (GPC) described below, and the Mw and the Mn are specified.

In the second exemplary embodiment, the measurement is performed similarly by replacing “charge transport layer” with “single layer type photosensitive layer”.

In the first exemplary embodiment, the method of measuring the mass M1 of the charge transport material contained in the charge transport layer and the mass M2 of the charge transport layer is as follows.

The solution from which the charge transport layer is extracted is concentrated, vacuum-dried, and weighed, thereby obtaining the mass M2 of the charge transport layer.

The solution remaining after the above-described reprecipitation treatment is concentrated, each material is isolated by preparative thin layer chromatography, and the yield is quantified. The charge transport materials are specified from each material isolated by nuclear magnetic resonance (NMR) measurement, and the yields of the charge transport materials are summed to obtain the mass M1.

In the second exemplary embodiment, the measurement is performed similarly by replacing “charge transport layer” with “single layer type photosensitive layer”.

In the first exemplary embodiment, the average thickness Ds of the charge transport layer is a value obtained by measuring the layer thicknesses at a total of 40 sites, 10 sites evenly divided in the axial direction and 4 equal parts (cut every 90°) in the circumferential direction of the photoreceptor, using an eddy current film thickness meter and arithmetically averaging the obtained thicknesses.

In the second exemplary embodiment, the average thickness Dt of the single layer type photosensitive layer is acquired similarly by replacing “charge transport layer” with “single layer type photosensitive layer”.

Resin

Hereinafter, the resin used for the photoreceptor according to the present exemplary embodiment will be described in detail.

The photoreceptor according to the present exemplary embodiment contains at least one resin selected from a polyester resin or a polycarbonate resin in the charge transport layer or the single layer type photosensitive layer.

The charge transport layer or the single layer type photosensitive layer contains, for example, preferably a polyester resin or a polycarbonate resin and more preferably a polyester resin.

Polyester Resin

The polyester resin has at least a dicarboxylic acid unit (A) and a diol unit (B). The polyester resin may have other dicarboxylic acid units in addition to the dicarboxylic acid unit (A). The polyester resin may have other diol units in addition to the diol unit (B).

The dicarboxylic acid unit (A) is a constitutional unit represented by Formula (A).

Formula (A)

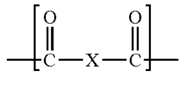

In Formula (A), X represents an organic group.

Examples of the organic group as X include an alkyl group, an aryl group, an aralkyl group, an alkoxy group, an aryloxy group, an ether group, a thioether group, and a combination of these groups.

Examples of the exemplary embodiment of the dicarboxylic acid unit (A) include a dicarboxylic acid unit (A') represented by Formula (A').

Formula (A')

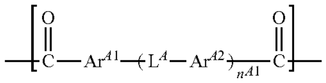

In Formula (A'), $Ar^{A1}$ and $Ar^{A2}$ each independently represent an aromatic ring that may have a substituent, $L^{A}$ represents a single bond or a divalent linking group, and $n^{A1}$ represents 0, 1, or 2.

The aromatic ring as $Ar^{A1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as Arm may be substituted with an alkyl group, an aryl group, an aralkyl group, an alkoxy group, an aryloxy group, a halogen atom, or the like. As the substituent in a case where the aromatic ring as Arm is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring of $Ar^{A2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{A2}$ may be substituted with an alkyl group, an aryl group, an aralkyl group, an alkoxy group, an aryloxy group, a halogen atom, or the like. As the substituent in a case where the aromatic ring as $Ar^{A2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

In a case where $L^{A}$ represents a divalent linking group, examples of the divalent linking group include an oxygen atom, a sulfur atom, and $—C(R^{a1})(R^{a2})—$. Here, $Ra^1$ and $Ra^2$ each independently represent a hydrogen atom, an alkyl group having 1 or more and 10 or less carbon atoms, an aryl group having 6 or more and 12 or less carbon atoms, or an aralkyl group having 7 or more and 20 or less carbon atoms, and $Ra^1$ and $Ra^2$ may be bonded to each other to form a cyclic alkyl group.

The alkyl group having 1 or more and 10 or less carbon atoms as $Ra^1$ and $Ra^2$ may be any of linear, branched, or cyclic. The number of carbon atoms of the alkyl group is, for example, preferably 1 or more and 6 or less, more preferably 1 or more and 4 or less, and still more preferably 1 or 2.

The aryl group having 6 or more and 12 or less carbon atoms as $Ra^1$ and $Ra^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ra^1$ and $Ra^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Ra^1$ and $Ra^2$ may be any of a monocycle or a polycycle. The number of carbon atoms of the aryl group is, for example, preferably 6 or more and 10 or less and more preferably 6.

It is preferable that the dicarboxylic acid unit (A) includes, for example, at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented Formula (A4).

Formula (A1)

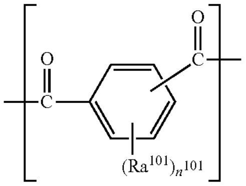

In Formula (A1), $n^{101}$ represents an integer of 0 or greater and 4 or less, and $Ra^{101}$ each independently represent an alkyl group having 1 or more and 10 or less carbon atoms, an aryl group having 6 or more and 12 or less carbon atoms, or an alkoxy group having 1 or more and 6 or less carbon atoms.

$n^{101}$ represents, for example, preferably 0, 1, or 2, more preferably 0 or 1, and still more preferably 0.

Formula (A2)

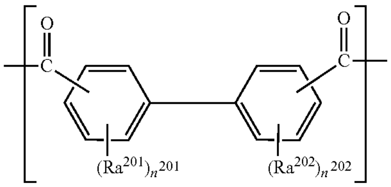

In Formula (A2), $n^{201}$ and $n^{202}$ each independently represent an integer of 0 or greater and 4 or less, $Ra^{201}$ and $Ra^{202}$ each independently represent an alkyl group having 1 or more and 10 or less carbon atoms, an aryl group having 6 or more and 12 or less carbon atoms, or an alkoxy group having 1 or more and 6 or less carbon atoms.

$n^{201}$ represents, for example, preferably 0, 1, or 2, more preferably 0 or 1, and still more preferably 0.

$n^{202}$ represents, for example, preferably 0, 1, or 2, more preferably 0 or 1, and still more preferably 0.

Formula (A3)

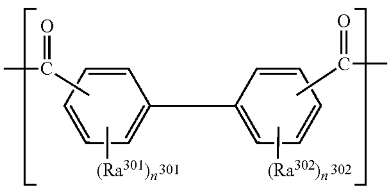

In Formula (A3), $n^{301}$ and $n^{302}$ each independently represent an integer of 0 or greater and 4 or less, and each independently represent an alkyl group having 1 or more and 10 or less carbon atoms, an aryl group having 6 or more and 12 or less carbon atoms, or an alkoxy group having 1 or more and 6 or less carbon atoms.

$n^{501}$ represents, for example, preferably 0, 1, or 2, more preferably 0 or 1, and still more preferably 0.

$n^{302}$ represents, for example, preferably 0, 1, or 2, more preferably 0 or 1, and still more preferably 0.

Formula (A4)

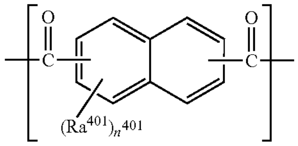

In Formula (A4), $n^{401}$ represents an integer of 0 or greater and 6 or less, and $Ra^{401}$ each independently represent an alkyl group having 1 or more and 10 or less carbon atoms, an aryl group having 6 or more and 12 or less carbon atoms, or an alkoxy group having 1 or more and 6 or less carbon atoms.

$n^{401}$ represents, for example, preferably an integer of 0 or greater and 4 or less, more n preferably 0, 1, or 2, and still more preferably 0.

The specific forms and the preferable forms of $Ra^{101}$ in Formula (A1), $Ra^{201}$ and $Ra^{202}$ in Formula (A2), $Ra^{301}$ and $Ra^{302}$ in Formula (A3), and $Ra^{401}$ in Formula (A4) are the same as each other, and hereinafter, $Ra^{101}$, $Ra^{201}$, $Ra^{202}$, $Ra^{301}$, $Ra^{302}$, and $Ra^{401}$ will be collectively referred to as "Ra".

The alkyl group having 1 or more and 10 or less carbon atoms as Ra may be any of linear, branched, or cyclic. The number of carbon atoms of the alkyl group is, for example, preferably 1 or more and 6 or less, more preferably 1 or more and 4 or less, and still more preferably 1 or 2.

Examples of the linear alkyl group having 1 or more and 10 or less carbon atoms include a methyl group, an ethyl group, an n-propyl group, an n-butyl group, an n-pentyl group, an n-hexyl group, an n-heptyl group, an n-octyl group, an n-nonyl group, and an n-decyl group.

Examples of the branched alkyl group having 3 or more and 10 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Examples of the cyclic alkyl group having 3 or more and 10 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and polycyclic (for example, bicyclic, tricyclic, or spirocyclic) alkyl groups to which these monocyclic alkyl groups are linked.

The aryl group having 6 or more and 12 or less carbon atoms as Ra may be any of a monocycle or a polycycle. The number of carbon atoms of the aryl group is, for example, preferably 6 or more and 10 or less and more preferably 6.

Examples of the aryl group having 6 or more and 12 or less carbon atoms include a phenyl group, a biphenyl group, a 1-naphthyl group, and a 2-naphthyl group.

The alkyl group in the alkoxy group having 1 or more and 6 or less carbon atoms as Ra may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Hereinafter, dicarboxylic acid units (A1-1) to (A1-9) are shown as specific examples of the dicarboxylic acid unit (A1). The dicarboxylic acid unit (A1) is not limited thereto.

(A1-1)

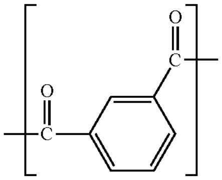

(A1-2)

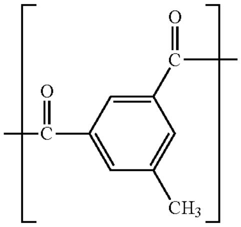

(A1-3)

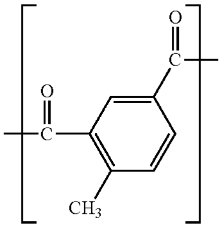

(A1-4)

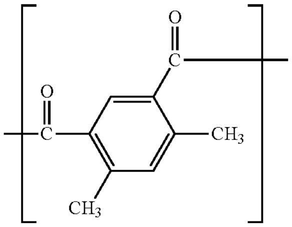

-continued (A1-5)

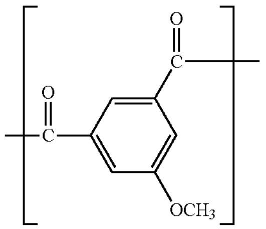

(A1-6)

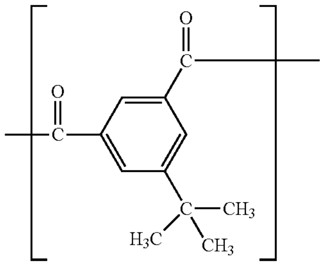

(A1-7)

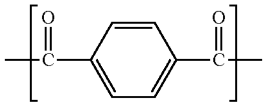

(A1-8)

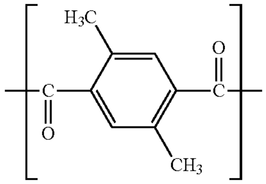

(A1-9)

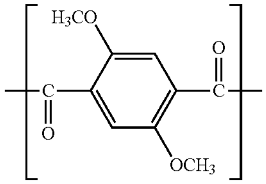

Hereinafter, dicarboxylic acid units (A2-1) to (A2-3) are shown as specific examples of the dicarboxylic acid unit (A2). The dicarboxylic acid unit (A2) is not limited thereto.

(A2-1)

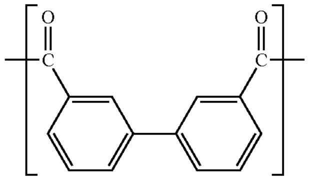

(A2-2)

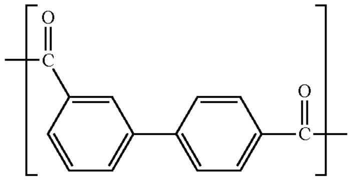

-continued (A2-3)

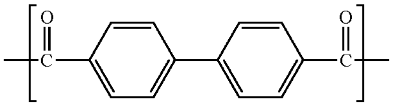

Hereinafter, dicarboxylic acid units (A3-1) and (A3-2) are shown as specific examples of the dicarboxylic acid unit (A3). The dicarboxylic acid unit (A3) is not limited thereto.

(A3-1)

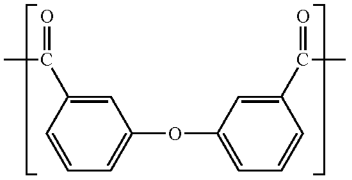

(A3-2)

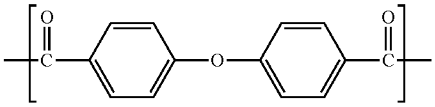

Hereinafter, dicarboxylic acid units (A4-1) to (A4-3) are shown as specific examples of the dicarboxylic acid unit (A4). The dicarboxylic acid unit (A4) is not limited thereto.

(A4-1)

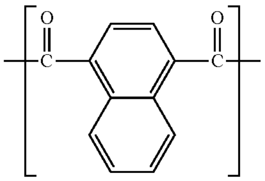

(A4-2)

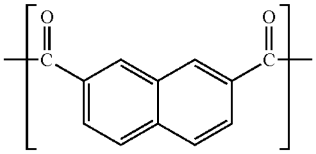

(A4-3)

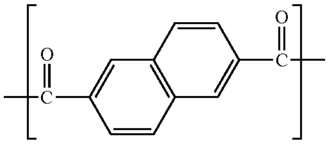

As the dicarboxylic acid unit (A), for example, (A1-1), (A1-7), (A2-3), (A3-2), and (A4-3) in the specific examples shown above are preferable, and (A2-3) is most preferable.

The total mass proportion of the dicarboxylic acid units (A1) to (A4) in the polyester resin is, for example, preferably 15% by mass or greater and 60% by mass or less.

In a case where the total mass proportion of the dicarboxylic acid units (A1) to (A4) is 15% by mass or greater, the abrasion resistance of the photosensitive layer is enhanced. From this viewpoint, the total mass proportion of the dicarboxylic acid units (A1) to (A4) is, for example, more preferably 20% by mass or greater and still more preferably 25% by mass or greater.

In a case where the total mass proportion of the dicarboxylic acid units (A1) to (A4) is 60% by mass or less, peeling of the photosensitive layer can be suppressed. From this viewpoint, the total mass proportion of the dicarboxylic acid units (A1) to (A4) is, for example, more preferably 55% by mass or less and still more preferably 50% by mass or less.

The dicarboxylic acid units (A1) to (A4) contained in the polyester resin (1) may be used alone or in combination of two or more kinds thereof.

Examples of other dicarboxylic acid units (A) in addition to the dicarboxylic acid units (A1) to (A4) include aliphatic dicarboxylic acid (such as oxalic acid, malonic acid, maleic acid, fumaric acid, citraconic acid, itaconic acid, glutaconic acid, succinic acid, alkenyl succinic acid, adipic acid, and sebacic acid) units, alicyclic dicarboxylic acid (such as cyclohexanedicarboxylic acid) units, and lower (for example, having 1 or more and 5 or less carbon atoms) alkyl ester units thereof. These dicarboxylic acid units contained in the polyester resin (1) may be used alone or in combination of two or more kinds thereof.

The dicarboxylic acid unit (A) contained in the polyester resin (1) may be used alone or in combination of two or more kinds thereof.

The diol unit (B) is a constitutional unit represented by Formula (B).

Formula (B)

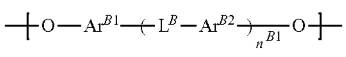

In Formula (B), $Ar^{B1}$ and $Ar^{B2}$ each independently represent an aromatic ring that may have a substituent, $L^{B}$ represents a single bond, an oxygen atom, a sulfur atom, or —C($Rb^1$)($Rb^2$)—, and $n^{B1}$ represents 0, 1, or 2. $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

The aromatic ring as $Ar^{B1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{B1}$ may be substituted with an alkyl group, an aryl group, an aralkyl group, an alkoxy group, an aryloxy group, a halogen atom, or the like. As the substituent in a case where the aromatic ring as $Ar^{B1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring as $Ar^{B2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{B2}$ may be substituted with an alkyl group, an aryl group, an aralkyl group, an alkoxy group, an aryloxy group, a halogen atom, or the like. As the substituent in a case where the aromatic ring as $Ar^{B2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The alkyl group having 1 or more and 20 or less carbon atoms as $Rb^1$ and $Rb^2$ may be linear, branched, or cyclic. The number of carbon atoms of the alkyl group is, for example, preferably 1 or more and 18 or less, more preferably 1 or more and 14 or less, and still more preferably 1 or more and 10 or less.

The aryl group having 6 or more and 12 or less carbon atoms as $Rb^1$ and $Rb^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Rb^1$ and $Rb^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Rb^1$ and $Rb^2$ may be any of a monocycle or a polycycle. The number of carbon atoms of the aryl group is, for example, preferably 6 or more and 10 or less and more preferably 6.

It is preferable that the diol unit (B) includes, for example, at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8).

Formula (B1)

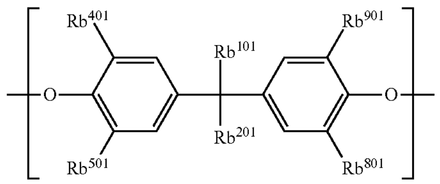

In Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom.

The number of carbon atoms of the branched alkyl group having 4 or more and 20 or less carbon atoms as $Rb^{101}$ is, for example, preferably 4 or more and 16 or less, more preferably 4 or more and 12 or less, and still more preferably 4 or more and 8 or less. Specific examples of $Rb^{101}$ include an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isododecyl group, a sec-dodecyl group, a tert-dodecyl group, a tert-tetradecyl group, and a tert-pentadecyl group.

Formula (B2)

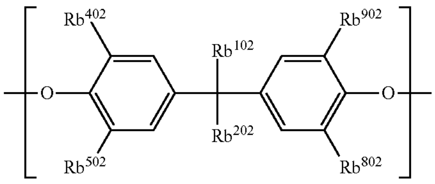

In Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 4 or more and 20 or less carbon atoms as $Rb^{102}$ is, for example, preferably 4 or more and 16 or less, more preferably 4 or more and 12 or less, and still more preferably 4 or more and 8 or less. Specific examples of $Rb^{102}$ include an n-butyl group, an n-pentyl group, an n-hexyl group, an n-heptyl group, an n-octyl group, an n-nonyl group, an n-decyl group, an n-undecyl group, an n-dodecyl group, a tridecyl group, an n-tetradecyl group, an n-pentadecyl group, an n-heptadecyl group, an n-octadecyl group, an n-nonadecyl group, and an n-icosyl group.

Formula (B3)

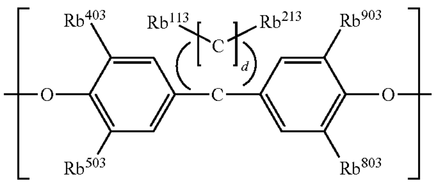

In Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 1 or more and 3 or less carbon atoms as $Rb^{113}$ and $Rb^{213}$ is, for example, preferably 1 or 2 and more preferably 1. Specific examples of such a group include a methyl group, an ethyl group, and an n-propyl group.

The alkyl group in the alkoxy group having 1 or more and 4 or less carbon atoms as $Rb^{113}$ and $Rb^{213}$ may be linear, branched, or cyclic. The number of carbon atoms of the alkyl group in the alkoxy group having 1 or more and 4 or less carbon atoms is, for example, preferably 1 or more and 3 or less, more preferably 1 or 2, and still more preferably 1. Specific examples of such a group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

Examples of the halogen atom as $Rb^{113}$ and $Rb^{213}$ include a fluorine atom, a chlorine atom, a bromine atom, and an iodine atom.

Formula (B4)

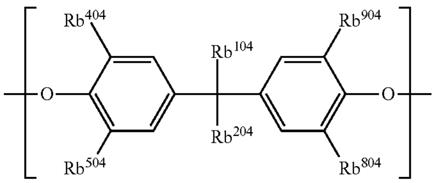

In Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom.

The alkyl group having 1 or more and 3 or less carbon atoms as $Rb^{104}$ may be any of linear, branched, or cyclic. The number of carbon atoms of the alkyl group is, for example, preferably 1 or 2 and more preferably 1. Specific examples of $Rb^{104}$ include a methyl group, an ethyl group, an n-propyl group, an isopropyl group, and a cyclopropyl group.

Formula (B5)

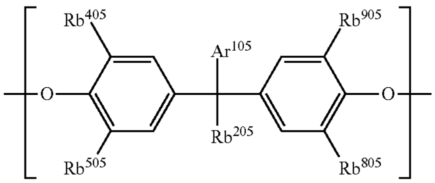

In Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom.

The aryl group having 6 or more and 12 or less carbon atoms as $Ar^{105}$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ar^{105}$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2. The aryl group in the aralkyl group having 7 or more and 20 or less carbon atoms as $Ar^{105}$ may be any of a monocycle or a polycycle. The number of carbon atoms of the aryl group is, for example, preferably 6 or more and 10 or less and more preferably 6. Examples of the aralkyl group having 7 or more and 20 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, and a phenyl-cyclopentylmethyl group.

Formula (B6)

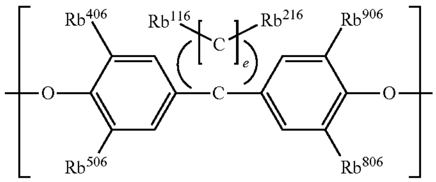

In Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 1 or more and 3 or less carbon atoms as $Rb^{116}$ and $Rb^{216}$ is, for example, preferably 1 or 2 and more preferably 1. Specific examples of such a group include a methyl group, an ethyl group, and an n-propyl group.

The alkyl group in the alkoxy group having 1 or more and 4 or less carbon atoms as $Rb^{116}$ and $Rb^{216}$ may be linear, branched, or cyclic. The number of carbon atoms of the alkyl group in the alkoxy group having 1 or more and 4 or less carbon atoms is, for example, preferably 1 or more and 3 or less, more preferably 1 or 2, and still more preferably 1. Specific examples of such a group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

Examples of the halogen atom as $Rb^{116}$ and $Rb^{216}$ include a fluorine atom, a chlorine atom, a bromine atom, and an iodine atom.

Formula (B7)

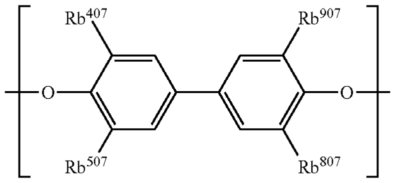

In Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom.

Formula (B8)

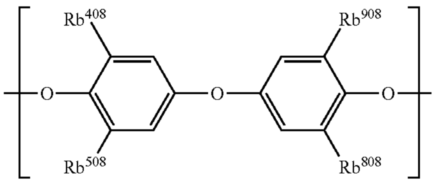

In Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

The specific forms and the preferable forms of $Rb^{201}$ in Formula (B1), $Rb^{202}$ in Formula (B2), $Rb^{204}$ in Formula (B4), and $Rb^{205}$ in Formula (B5) are the same as each other, and hereinafter, $Rb^{201}$, $Rb^{202}$, $Rb^{204}$, and $Rb^{205}$ will be collectively referred to as "$Rb^{200}$".

The alkyl group having 1 or more and 3 or less carbon atoms as $Rb^{200}$ may be any of linear, branched, or cyclic. The number of carbon atoms of the alkyl group is, for example, preferably 1 or 2 and more preferably 1.

The alkyl group having 1 or more and 3 or less carbon atoms includes a methyl group, an ethyl group, an n-propyl group, an isopropyl group, and a cyclopropyl group.

The specific forms and the preferable forms of $Rb^{401}$ in Formula (B1), $Rb^{402}$ in Formula (B2), $Rb^{403}$ in Formula (B3), $Rb^{404}$ in Formula (B4), $Rb^{405}$ in Formula (B5), $Rb^{406}$ in Formula (B6), $Rb^{407}$ in Formula (B7), and $Rb^{408}$ in Formula (B8) are the same as each other, and hereinafter, $Rb^{401}$, $Rb^{402}$, $Rb^{403}$, $Rb^{404}$, $Rb^{405}$, $Rb^{406}$, $Rb^{407}$, and $Rb^{408}$ will be collectively referred to as "$Rb^{400}$".

The alkyl group having 1 or more and 4 or less carbon atoms as $Rb^{400}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{400}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{400}$ include a fluorine atom, a chlorine atom, a bromine atom, and an iodine atom.

The specific forms and the preferable forms of $Rb^{501}$ in Formula (B1), $Rb^{502}$ in Formula (B2), $Rb^{503}$ in Formula (B3), $Rb^{504}$ in Formula (B4), $Rb^{505}$ in Formula (B5), $Rb^{506}$ in Formula (B6), $Rb^{507}$ in Formula (B7), and $Rb^{508}$ in Formula (B8) are the same as each other, and hereinafter, $Rb^{501}$, $Rb^{502}$, $Rb^{503}$, $Rb^{504}$, $Rb^{505}$, $Rb^{506}$, $Rb^{507}$, and $Rb^{508}$ will be collectively referred to as "$Rb^{500}$".

The alkyl group having 1 or more and 4 or less carbon atoms as $Rb^{500}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{500}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{500}$ include a fluorine atom, a chlorine atom, a bromine atom, and an iodine atom.

The specific forms and the preferable forms of $Rb^{801}$ in Formula (B1), $Rb^{802}$ in Formula (B2), $Rb^{803}$ in Formula (B3), $Rb^{804}$ in Formula (B4), $Rb^{805}$ in Formula (B5), $Rb^{806}$ in Formula (B6), $Rb^{807}$ in Formula (B7), and $Rb^{808}$ in Formula (B8) are the same as each other, and hereinafter, $Rb^{801}$, $Rb^{802}$, $Rb^{803}$, $Rb^{804}$, $Rb^{805}$, $Rb^{806}$, $Rb^{807}$, and $Rb^{808}$ will be collectively referred to as "$Rb^{800}$".

The alkyl group having 1 or more and 4 or less carbon atoms as $Rb^{800}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{800}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{800}$ include a fluorine atom, a chlorine atom, a bromine atom, and an iodine atom.

The specific forms and the preferable forms of $Rb^{901}$ in Formula (B1), $Rb^{902}$ in Formula (B2), $Rb^{903}$ in Formula (B3), $Rb^{904}$ in Formula (B4), $Rb^{905}$ in Formula (B5), $Rb^{906}$ in Formula (B6), $Rb^{907}$ in Formula (B7), and $Rb^{908}$ in Formula (B8) are the same as each other, and hereinafter, $Rb^{901}$, $Rb^{902}$, $Rb^{903}$, $Rb^{904}$, $Rb^{905}$, $Rb^{906}$, $Rb^{907}$, and $Rb^{908}$ will be collectively referred to as "$Rb^{900}$".

The alkyl group having 1 or more and 4 or less carbon atoms as $Rb^{900}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{900}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{900}$ include a fluorine atom, a chlorine atom, a bromine atom, and an iodine atom.

Hereinafter, diol units (B1-1) to (B1-6) are shown as specific examples of the diol unit (B1). The diol unit (B1) is not limited thereto.

(B1-1)
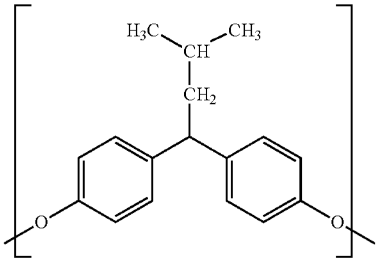
(B1-2)
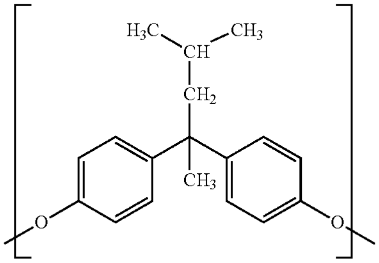
(B1-3)
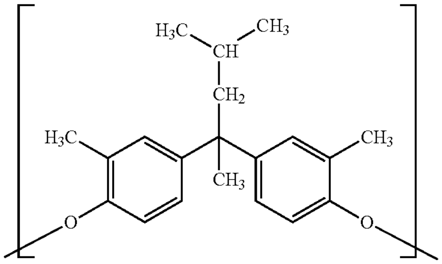
(B1-4)
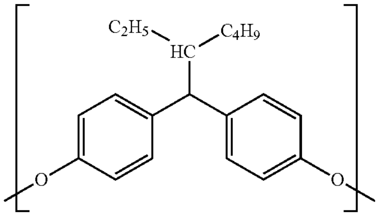
(B1-5)
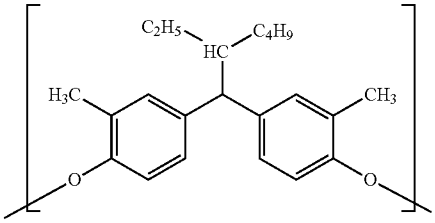
(B1-6)
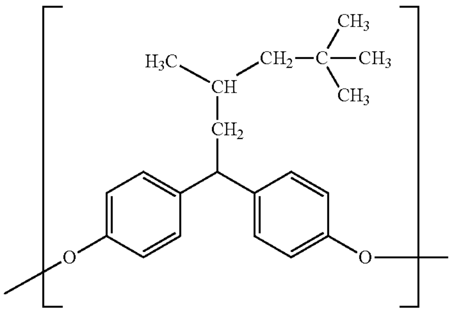
Hereinafter, diol units (B2-1) to (B2-11) are shown as specific examples of the diol unit (B2). The diol unit (B2) is not limited thereto.
(B2-1)
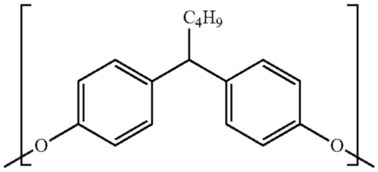
(B2-2)
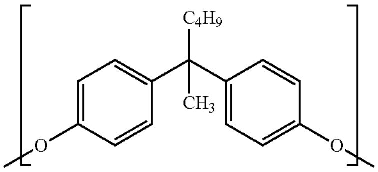
(B2-3)
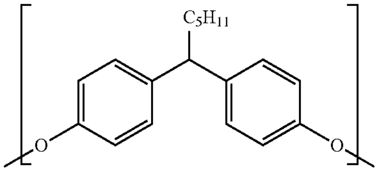
(B2-4)
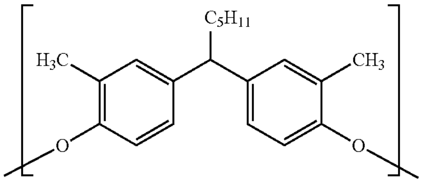
(B2-5)
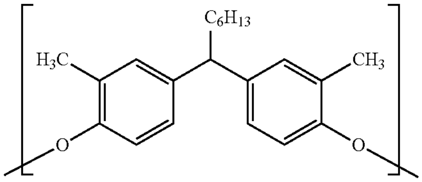
(B2-6)
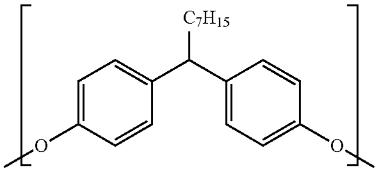
(B2-7)
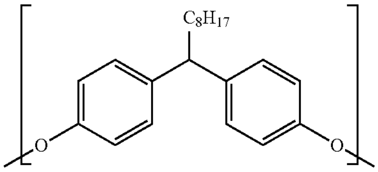
(B2-8)
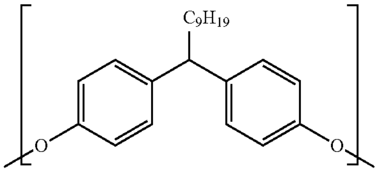

-continued
(B2-9)
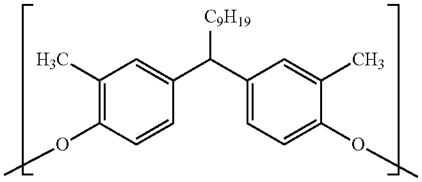
(B2-10)
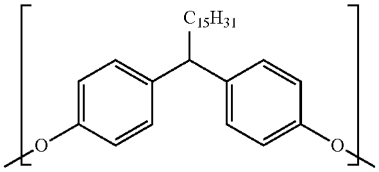
(B2-11)
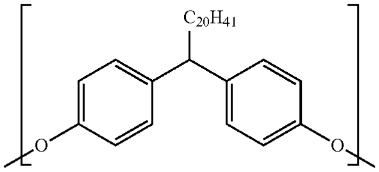
Hereinafter, diol units (B3-1) to (B3-4) are shown as specific examples of the diol unit (B3). The diol unit (B3) is not limited thereto.
(B3-1)
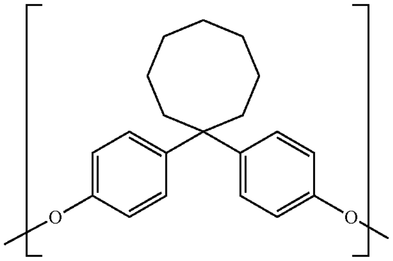
(B3-2)
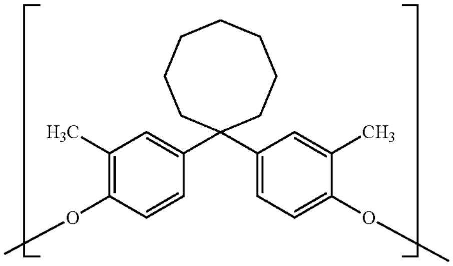
(B3-3)
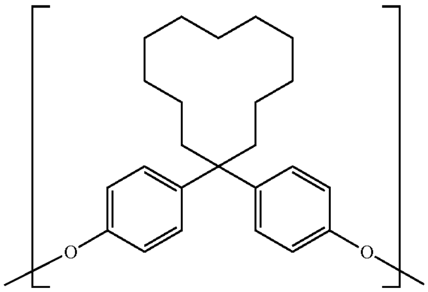
-continued
(B3-4)
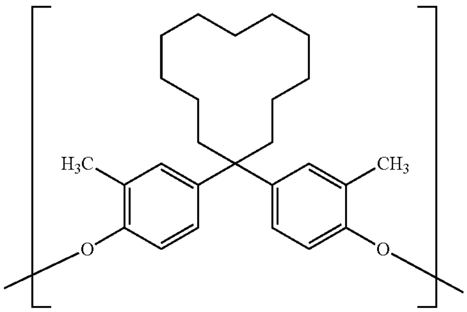
Hereinafter, diol units (B4-1) to (B4-7) are shown as specific examples of the diol unit (B4). The diol unit (B4) is not limited thereto.
(B4-1)
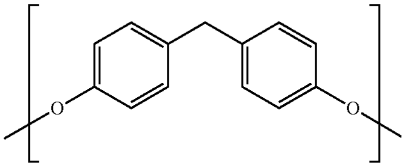
(B4-2)
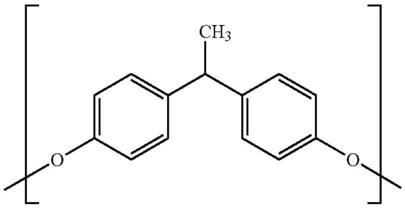
(B4-3)
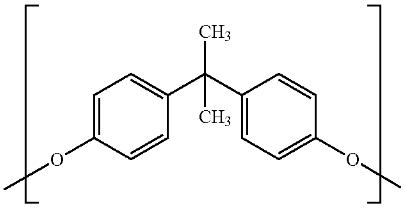
(B4-4)
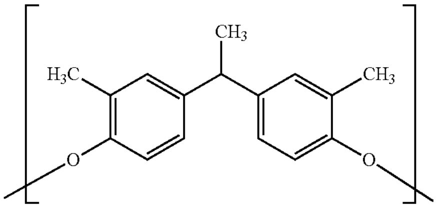
(B4-5)
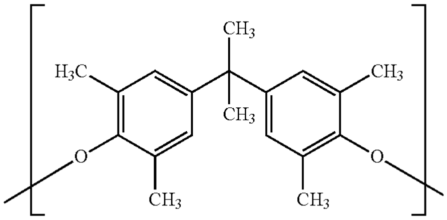

-continued
(B4-6)
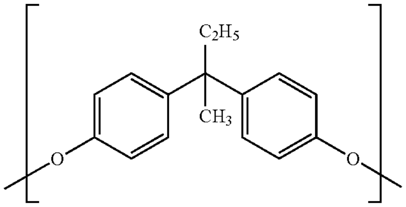
(B4-7)
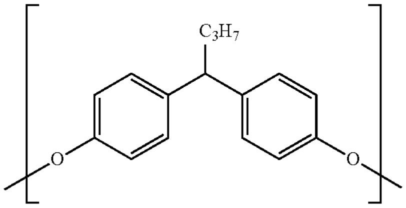
Hereinafter, diol units (B5-1) to (B5-6) are shown as specific examples of the diol unit (B5). The diol unit (B5) is not limited thereto.
(B5-1)
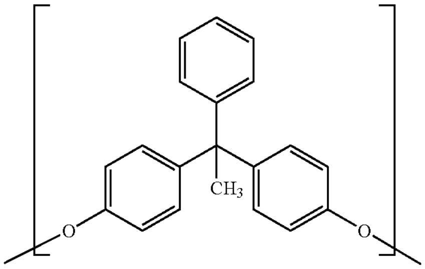
(B5-2)
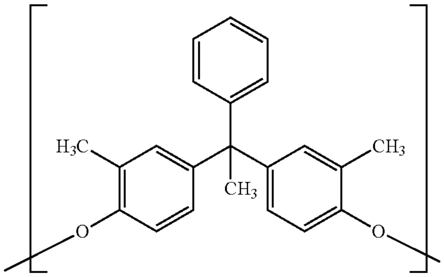
(B5-3)
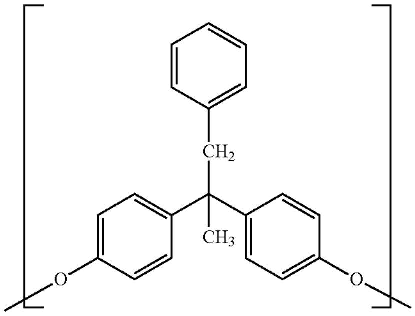
-continued
(B5-4)
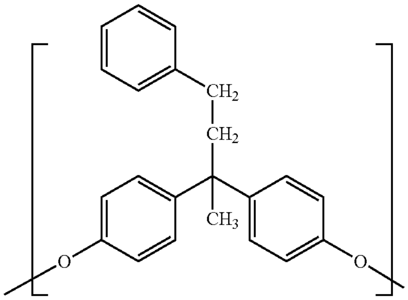
(B5-5)
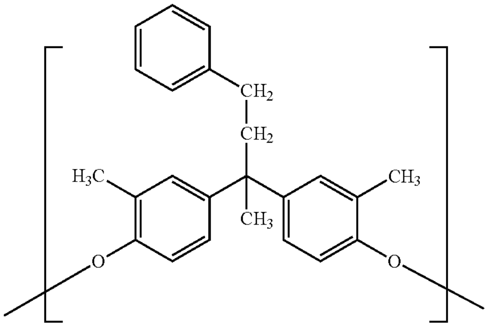
(B5-6)
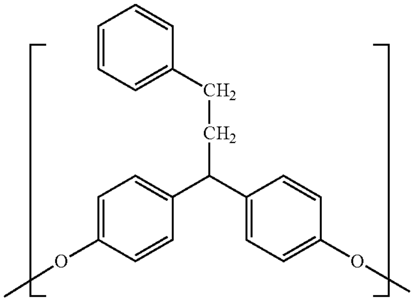
Hereinafter, diol units (B6-1) to (B6-4) are shown as specific examples of the diol unit (B6). The diol unit (B6) is not limited thereto.
(B6-1)
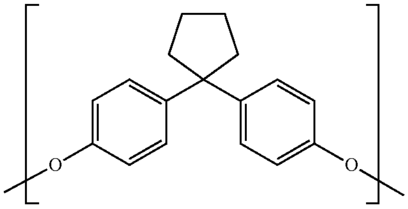
(B6-2)
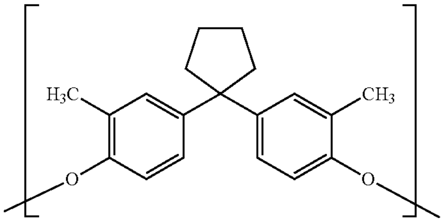

-continued (B6-3)

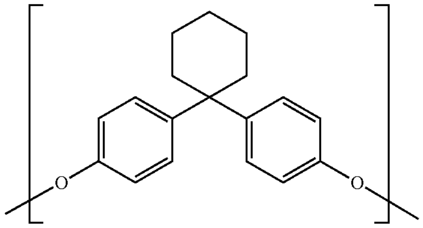

(B6-4)

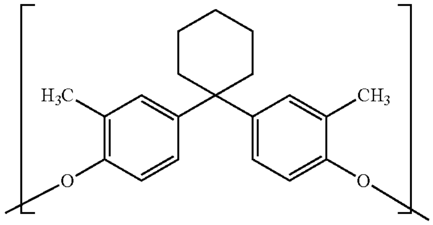

Hereinafter, diol units (B7-1) to (B7-3) are shown as specific examples of the diol unit (B7). The diol unit (B7) is not limited thereto.

(B7-1)

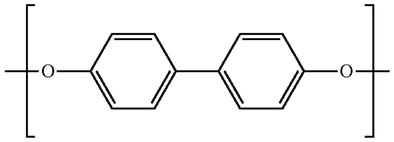

(B7-2)

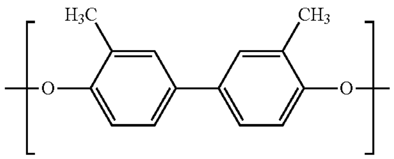

(B7-3)

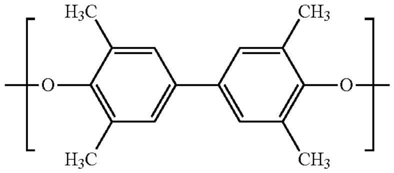

Hereinafter, diol units (B8-1) to (B8-3) are shown as specific examples of the diol unit (B8). The diol unit (B8) is not limited thereto.

(B8-1)

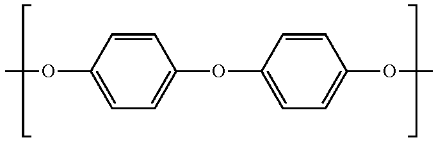

(B8-2)

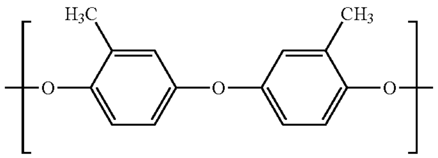

-continued (B8-3)

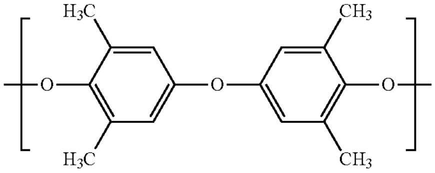

The diol unit (B) contained in the polyester resin (1) may be used alone or in combination of two or more kinds thereof.

The mass proportion of the diol unit (B) in the polyester resin is, for example, preferably 25% by mass or greater and 80% by mass or less.

In a case where the mass proportion of the diol unit (B) is 25% by mass or greater, peeling of the photosensitive layer can be further suppressed. From this viewpoint, the mass proportion of the diol unit (B) is, for example, more preferably 30% by mass or greater and still more preferably 35% by mass or greater.

In a case where the mass proportion of the diol unit (B) is 80% by mass or less, the solubility in a coating solution for forming the photosensitive layer is maintained, and thus the abrasion resistance can be improved. From this viewpoint, the mass proportion of the diol unit (B) is, for example, more preferably 75% by mass or less and still more preferably 70% by mass or less.

Examples of other diol units in addition to the diol unit (B) include aliphatic diol (such as ethylene glycol, diethylene glycol, triethylene glycol, propylene glycol, butanediol, hexanediol, and neopentyl glycol) units and alicyclic diol (such as cyclohexanediol, cyclohexane dimethanol, and hydrogenated bisphenol A) units. These diol units contained in the polyester resin may be used alone or in combination of two or more kinds thereof.

A terminal of the polyester resin may be sealed or modified with a terminal-sealing agent, a molecular weight modifier, or the like used in a case of the production. Examples of the terminal-sealing agent or the molecular weight modifier include monohydric phenol, monovalent acid chloride, monohydric alcohol, and monovalent carboxylic acid.

Examples of the monohydric phenol include phenol, o-cresol, m-cresol, p-cresol, o-ethylphenol, m-ethylphenol, p-ethylphenol, o-propylphenol, m-propylphenol, p-propylphenol, o-tert-butylphenol, m-tert-butylphenol, p-tert-butylphenol, pentylphenol, hexylphenol, octylphenol, nonylphenol, a 2,6-dimethylphenol derivative, a 2-methylphenol derivative, o-phenylphenol, m-phenylphenol, p-phenylphenol, o-methoxyphenol, m-methoxyphenol, p-methoxyphenol, 2,3,6-trimethylphenol, 2,3-xylenol, 2,4-xylenol, 2,5-xylenol, 2,6-xylenol, 3,4-xylenol, 3,5-xylenol, 2-phenyl-2-(4-hydroxyphenyl)propane, 2-phenyl-2-(2-hydroxyphenyl)propane, and 2-phenyl-2-(3-hydroxyphenyl)propane.

Examples of the monovalent acid chloride include monofunctional acid halides such as benzoyl chloride, benzoic acid chloride, methanesulfonyl chloride, phenylchloroformate, acetic acid chloride, butyric acid chloride, octyl acid chloride, benzenesulfonyl chloride, benzenesulfinyl chloride, sulfinyl chloride, benzene phosphonyl chloride, and substituents thereof.

Examples of the monohydric alcohol include methanol, ethanol, n-propanol, isopropanol, n-butanol, 2-butanol, pentanol, hexanol, dodecyl alcohol, stearyl alcohol, benzyl alcohol, and phenethyl alcohol.

Examples of the monovalent carboxylic acid include acetic acid, propionic acid, octanoic acid, cyclohexanecarboxylic acid, benzoic acid, toluic acid, phenylacetic acid, p-tert-butylbenzoic acid, and p-methoxyphenylacetic acid.

The weight-average molecular weight of the polyester resin is, for example, preferably 30,000 or greater and 300,000 or less, more preferably 40,000 or greater and 250,000 or less, and still more preferably 50,000 or greater and 200,000 or less.

The molecular weight of the polyester resin is a molecular weight measured by gel permeation chromatography (GPC) in terms of polystyrene. The GPC is carried out by using tetrahydrofuran as an eluent.

Examples of the method of producing the polyester resin include an interfacial polymerization method, a solution polymerization method, and a melt polymerization method.

Polycarbonate Resin

As the polycarbonate resin, a known polycarbonate resin is used, and preferred examples thereof include a polycarbonate resin having a structural unit that has at least one of a biphenyl skeleton or a bisphenol skeleton (hereinafter, also referred to as "BP polycarbonate resin").

Examples of the BP polycarbonate resin include a homopolymer formed of a structural unit having a biphenyl skeleton, a homopolymer formed of a structural unit having a bisphenol skeleton, and a copolymer formed of at least one of a structural unit having a biphenyl skeleton or a structural unit having a bisphenol skeleton. Among these, from the viewpoint of the abrasion resistance, for example, a homopolymer formed of a structural unit having a bisphenol skeleton is preferable as the BP polycarbonate resin.

Further, examples of the bisphenol skeleton include a bisphenol A skeleton, a bisphenol B skeleton, a bisphenol BP skeleton, a bisphenol C skeleton, a bisphenol F skeleton, and a bisphenol Z skeleton.

Specific examples of the BP polycarbonate resin include a homopolymer of a dihydroxybiphenyl compound, a homopolymer of a dihydroxybisphenol compound, and a copolymer thereof. These polymers can be obtained, for example, by a method such as polycondensation with a carbonate ester-forming compound such as phosgene or a transesterification reaction with bisaryl carbonate using the above-described compounds as raw materials.

The dihydroxybiphenyl compound is a biphenyl compound having a biphenyl skeleton in which two benzene rings of the biphenyl skeleton each have one hydroxyl group. Examples of the dihydroxybiphenyl compound include 4,4'-dihydroxybiphenyl, 4,4'-dihydroxy-3,3'-dimethylbiphenyl, 4,4'-dihydroxy-2,2'-dimethylbiphenyl, 4,4'-dihydroxy-3,3'-dicyclohexylbiphenyl, 3,3'-difluoro-4,4'-dihydroxybiphenyl, and 4,4'-dihydroxy-3,3'-diphenylbiphenyl.

These dihydroxybiphenyl compounds may be used alone or in combination of a plurality of kinds thereof.

The dihydroxybisphenol compound is a bisphenol compound having a bisphenol skeleton in which two benzene rings of the bisphenol skeleton each have one hydroxyl group. Examples of the dihydroxybisphenol compound include bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(3-methyl-4-hydroxyphenyl)butane, 2,2-bis(4-hydroxyphenyl)butane, 2,2-bis(4-hydroxyphenyl)octane, 4,4-bis(4-hydroxyphenyl)heptane, 1,1-bis(4-hydroxyphenyl)-1,1-diphenylmethane, 1,1-bis(4-hydroxyphenyl)-1-phenyl ethane, 1,1-bis(4-hydroxyphenyl)-1-phenylmethane, bis(4-hydroxyphenyl)ether, bis(4-hydroxyphenyl)sulfide, bis(4-hydroxyphenyl)sulfone, 1,1-bis(4-hydroxyphenyl)cyclopentane, 1,1-bis(4-hydroxyphenyl)cyclohexane, 2,2-bis(3-methyl-4-hydroxyphenyl)propane, 2-(3-methyl-4-hydroxyphenyl)-2-(4-hydroxyphenyl)-1-phenylethane, bis(3-methyl-4-hydroxyphenyl)sulfide, bis(3-methyl-4-hydroxyphenyl) sulfone, bis(3-methyl-4-hydroxyphenyl)methane, 1,1-bis(3-methyl-4-hydroxyphenyl)cyclohexane, 2,2-bis(2-methyl-4-hydroxyphenyl)propane, 1,1-bis(2-butyl-4-hydroxy-5)-methylphenyl)butane, 1,1-bis(2-tert-butyl-4-hydroxy-3-methylphenyl)ethane, 1,1-bis(2-tert-butyl-4-hydroxy-5-methylphenyl)propane, 1,1-bis(2-tert-butyl-4-hydroxy-5-methylphenyl)butane, 1,1-bis(2-tert-butyl-4-hydroxy-5-methylphenyl)isobutane, 1,1-bis(2-tert-butyl-4-hydroxy-5-methylphenyl)heptane, 1,1-bis(2-tert-butyl-4-hydroxy-5-methylphenyl)-1-phenylmethane, 1,1-bis(2-tert-amyl-4-hydroxy-5-methylphenyl)butane, bis(3-chloro-4-hydroxyphenyl)methane, bis(3,5-dibromo-4-hydroxyphenyl)methane, 2,2-bis(3-chloro-4-hydroxyphenyl)propane, 2,2-bis(3-fluoro-4-hydroxyphenyl) propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(3-bromo-4-hydroxy-5-chlorophenyl)propane, 2,2-bis(3,5-dichloro-4-hydroxyphenyl)butane, 2,2-bis(3,5-dibromo-4-hydroxyphenyl)butane, 1-phenyl-1,1-bis(3-fluoro-4-hydroxyphenyl)ethane, bis(3-fluoro-4-hydroxyphenyl)ether, and 1,1-bis(3-cyclohexyl-4-hydroxyphenyl)cyclohexane.

These bisphenol compounds may be used alone or in combination of a plurality of kinds thereof.

Among these, from the viewpoint of the abrasion resistance of the charge transport layer or the single layer type photosensitive layer, for example, a polycarbonate resin having at least one of a structural unit represented by General Formula (PCA) or a structural unit represented by General Formula (PCB) is preferable as the BP polycarbonate resin. That is, preferred examples of the BP polycarbonate resin include a homopolymer formed of a structural unit represented by General Formula (PCA), a homopolymer formed of a structural unit represented by General Formula (PCB), and a copolymer thereof

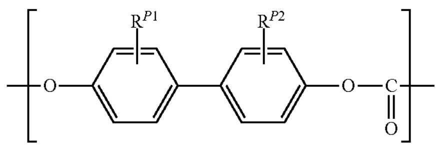

(PCA)

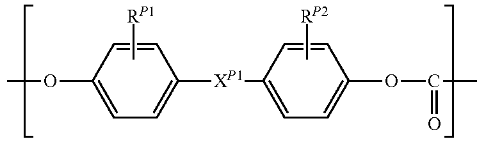

(PCB)

In General Formulae (PCA) and (PCB), $R^{P1}$, $R^{P2}$, $R^{P3}$, and $R^{P4}$ each independently represent a hydrogen atom, a halogen atom, an alkyl group having 1 or more and 6 or less carbon atoms, a cycloalkyl group having 5 or more and 7 or less carbon atoms, or an aryl group having 6 or more and 12 or less carbon atoms. $X^{P1}$ represents a phenylene group, a biphenylylene group, a naphthylene group, an alkylene group, or a cycloalkylene group.

Examples of the alkyl group represented by $R^{P1}$, $R^{P2}$, $R^{P3}$, and $R^{P4}$ in General Formulae (PCA) and (PCB) include a linear or branched alkyl group having 1 or more and 6 or less carbon atoms (for example, preferably 1 or more and 3 or less carbon atoms).

Specific examples of the linear alkyl group include a methyl group, an ethyl group, an n-propyl group, an n-butyl group, an n-pentyl group, and an n-hexyl group.

Specific examples of the branched alkyl group include an isopropyl group, an isobutyl group, a sec-butyl group, a tert-butyl group, an isopentyl group, a neopentyl group, a tert-pentyl group, an isohexyl group, a sec-hexyl group, and a tert-hexyl group.

Among these, for example, a lower alkyl group such as a methyl group or an ethyl group is preferable as the alkyl group.

Examples of the cycloalkyl group represented by $R^{P1}$, $R^{P2}$, $R^{P3}$, and $R^{P4}$ in General Formulae (PCA) and (PCB) include cyclopentyl, cyclohexyl, and cycloheptyl.

Examples of the aryl group represented by $R^{P1}$, $R^{P2}$, $R^{P3}$, and $R^{P4}$ in General Formulae (PCA) and (PCB) include a phenyl group, a naphthyl group, and a biphenylyl group.

Examples of the alkylene group represented by $X^{P1}$ in General Formulae (PCA) and (PCB) include a linear or branched alkylene group having 1 or more and 12 or less carbon atoms (for example, preferably 1 or more and 6 or less carbon atoms and more preferably 1 or more and 3 or less carbon atoms).

Specific examples of the linear alkylene group include a methylene group, an ethylene group, an n-propylene group, an n-butylene group, an n-pentylene group, an n-hexylene group, an n-heptylene group, an n-octylene group, an n-nonylene group, an n-decylene group, an n-undecylene group, and an n-dodecylene group.

Specific examples of the branched alkylene group include an isopropylene group, an isobutylene group, a sec-butylene group, a tert-butylene group, an isopentylene group, a neopentylene group, a tert-pentylene group, an isohexylene group, a sec-hexylene group, a tert-hexylene group, an isoheptylene group, a sec-heptylene group, a tert-heptylene group, an isooctylene group, a sec-octylene group, a tert-octylene group, an isononylene group, a sec-nonylene group, a tert-nonylene group, an isodecylene group, a sec-decylene group, a tert-decylene group, an isoundecylene group, a sec-undecylene group, a tert-undecylene group, a neoundecylene group, an isododecylene group, a sec-dodecylene group, a tert-dodecylene group, and a neododecylene group.

Among these, preferred examples of the alkylene group include a lower alkyl group such as a methylene group, an ethylene group, or a butylene group.

Examples of the cycloalkylene group represented by $X^{P1}$ in General Formulae (PCA) and (PCB) include a cycloalkylene group having 3 or more and 12 or less carbon atoms (for example, preferably 3 or more and 10 or less carbon atoms and more preferably 5 or more and 8 or less carbon atoms).

Specific examples of the cycloalkylene group include a cyclopropylene group, a cyclopentylene group, a cyclohexylene group, a cyclooctylene group, and a cyclododecanylene group.

Among these, for example, a cyclohexylene group is preferable as the cycloalkylene group.

Further, each substituent represented by $R^{P1}$, $R^{P2}$, $R^{P3}$, $R^{P4}$, or $X^{P1}$ in General Formulae (PCA) and (PCB) includes a group further having a substituent. Examples of the substituent include a halogen atom (such as a fluorine atom or a chlorine atom), an alkyl group (such as an alkyl group having 1 or more and 6 or less carbon atoms), a cycloalkyl group (such as a cycloalkyl group having 5 or more and 7 or less carbon atoms), an alkoxy group (such as an alkoxy group having 1 or more and 4 or less carbon atoms), and an aryl group (such as a phenyl group, a naphthyl group, or a biphenylyl group).

In General Formula (PCA), $R^{P1}$ and $R^{P2}$ each independently represent, for example, preferably a hydrogen atom or an alkyl group having 1 or more and 6 or less carbon atoms and more preferably a hydrogen atom.

In General Formula (PCB), it is preferable that $R^{P3}$ and $R^{P4}$ each independently represent, for example, a hydrogen atom or an alkyl group having 1 or more and 6 or less carbon atoms and that $X^{P1}$ represents an alkylene group or a cycloalkylene group.

Specific examples of the BP polycarbonate resin include the following resins, but the examples are not limited thereto.

(PCA-1)

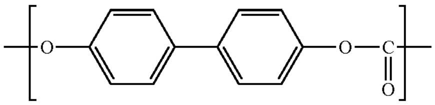

(PCB-1)

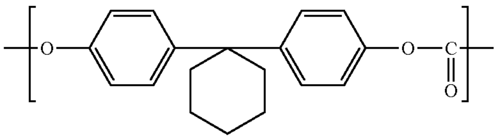

(PCB-2)

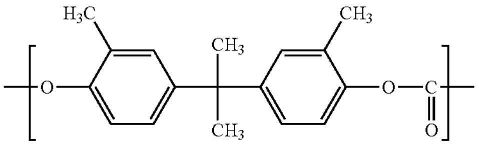

(PCB-3)

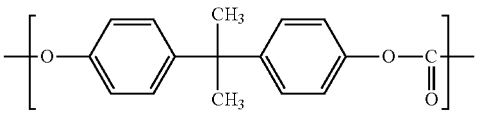

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $1\times10^{13}$ Ωcm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. In a case where incoherent light is used as a light source, roughening of the surface to prevent interference fringes is not particularly necessary, and it is appropriate for longer life because occurrence of defects due to the unevenness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the micropores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 μm or greater and 15 μm or less.

The boehmite treatment is carried out, for example, by immersing the conductive substrate in pure water at 90° C. or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $1\times10^2$ Ωcm or greater and $1\times10^{11}$ Ωcm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2$/g or greater.

The volume average particle diameter of the inorganic particles may be, for example, 50 nm or greater and 2,000 nm or less (for example, preferably 60 nm or greater and 1,000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltri ethoxysilane, N-2-(aminoethyl)-3-aminopropyltrimethoxysilane, N-2-(aminoethyl)-3-aminopropylmethyldimethoxysilane, and N,N-bis (2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

Here, the undercoat layer may contain an electron-accepting compound (acceptor compound) together with the inorganic particles, for example, from the viewpoint of enhancing the long-term stability of the electrical properties and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophenone compound; and a diphenoquinone compound such as 3,3',5,5'-tetra-t-butyldiphenoquinone.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

The electron-accepting compound may be attached to the surface before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The thickness of the undercoat layer is set to, for example, preferably 15 μm or greater and more preferably 20 μm or greater and 50 μm or less.

Interlayer

An interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, a knife coating method, and a curtain coating method.

The thickness of the interlayer is set to be, for example, preferably in a range of 0.1 μm or greater and 3 μm or less. The interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is preferable in a case where an incoherent light source, for example, a light emitting diode (LED) or an organic electro-luminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of 20 μm or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer.

The n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $1\times10^{13}$ Ωcm or greater.

These binder resins may be used alone or in the form of a mixture of two or more kinds thereof.

The blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. The charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type homogenizer in which a dispersion liquid is dispersed by a liquid-liquid collision or a liquid-wall collision in a high-pressure state, and a penetration type homogenizer in which a dispersion liquid is dispersed by penetrating the liquid through a micro-flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The thickness of the charge generation layer is set to, for example, preferably 0.1 μm or greater and 5.0 μm or less and more preferably 0.2 μm or greater and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

From the viewpoint of the charge mobility, for example, a triarylamine derivative represented by Structural Formula (a-1) or a benzidine derivative represented by Structural Formula (a-2) is preferable as the charge transport material.

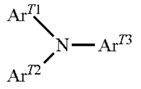

(a-1)

In Structural Formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

(a-2)

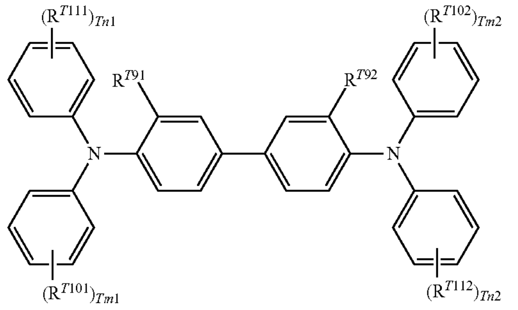

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, a substituted amino group substituted with an alkyl group having 1 or more and 2 or less carbon atoms, a substituted or unsubstituted aryl group, $—C(R^{T12})=C(R^{T13})(R^{T14})$, or $—CH=CH—CH=C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or greater and 2 or less.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

Here, among the triarylamine derivative represented by Structural Formula (a-1) and the benzidine derivative represented by Structural Formula (a-2), for example, a triarylamine derivative having "$—C_6H_4—CH=CH—CH=C(R^{T7})(R^{T8})$" and a benzidine derivative having "$—CH=CH—CH=C(R^{T15})(R^{T16})$" are particularly preferable from the viewpoint of the charge mobility.

As the polymer charge transport material, known materials having charge transport properties, such as poly-N-vinylcarbazole, polysilane, and a polyester-based polymer charge transport material can be used. Particularly, for example, a polyester-based polymer charge transport material is particularly preferable. The polymer charge transport material may be used alone or in combination of binder resins.

Examples of the charge transport material or the polymer charge transport material include a polycyclic aromatic compound, a heterocyclic compound, a hydrazone compound, a styryl compound, an enamine compound, a benzidine compound, a triarylamine compound, a diamine compound, an oxadiazole compound, a carbazole compound, an organic polysilane compound, a pyrazoline compound, an indole compound, an oxazole compound, an isoxazole compound, a thiazole compound, a thiadiazole compound, an imidazole compound, a pyrazole compound, a triazole compound, and a resin containing a group derived from any of these substances. Specific examples thereof include compounds described in paragraphs 0078 to 0080 of JP2021-117377A, paragraphs 0046 to 0048 of JP2019-035900A, paragraphs 0052 and 0053 of JP2019-012141A, paragraphs 0122 to 0134 of JP2021-071565A, paragraphs 0101 to 0110 of JP2021-015223A, and paragraph 0116 of JP2013-097300A.

The content of the charge transport material contained in the charge transport layer may be, for example, preferably 28% by mass or greater and 55% by mass or less with respect to the total solid content.

The charge transport layer contains a specific resin as a binder resin. The proportion of the specific resin in the total amount of the binder resin contained in the charge transport layer is, for example, preferably 50% by mass or greater, more preferably 80% by mass or greater, still more preferably 90% by mass or greater, particularly preferably 95% by mass or greater, and most preferably 100% by mass.

The charge transport layer may contain other binder resins in addition to the specific resin. Examples of other binder resins include a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. These binder resins may be used alone or in combination of two or more kinds thereof.

The charge transport layer may also contain other known additives. Examples of the additives include an antioxidant, a leveling agent, an antifoaming agent, a filler, and a viscosity adjuster.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Here, the film physical properties of the charge transport layer can be easily enhanced by setting the work rate in the drying step performed on the coating film of a coating solution for forming a charge transport layer to greater than 7 W. In this manner, any one or both improvement of the abrasion resistance and suppression of filming can be easily achieved. Here, the work rate is a value defined by dividing the amount of heat (J) applied to the coating film in the drying step by the time (sec), and the unit is "W".

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The average thickness Ds of the charge transport layer is 27 μm or greater and 50 μm or less, for example, preferably 31 μm or greater and 48 μm or less, more preferably 35 μm or greater and 46 μm or less, and still more preferably 37 μm or greater and 45 μm or less.

Single Layer Type Photosensitive Layer

The single layer type photosensitive layer (charge generation/charge transport layer) is a layer containing a charge generation material, a charge transport material, a binder resin, and as necessary, other additives. These materials are the same as the materials described in the sections of the charge generation layer and the charge transport layer.

The single layer type photosensitive layer contains a specific resin as a binder resin. The total proportion of the specific resin in the total amount of the binder resin contained in the single layer type photosensitive layer is, for example, preferably 50% by mass or greater, more preferably 80% by mass or greater, still more preferably 90% by mass or greater, particularly preferably 95% by mass or greater, and most preferably 100% by mass.

The content of the charge generation material in the single layer type photosensitive layer may be, for example, 0.1% by mass or greater and 10% by mass or less and preferably 0.8% by mass or greater and 5% by mass or less with respect to the total solid content.

The content of the charge transport material contained in the single layer type photosensitive layer may be, for example, 40% by mass or greater and 60% by mass or less with respect to the total solid content.

The single layer type photosensitive layer is formed by, for example, forming a coating film of a coating solution for forming a single layer type photosensitive layer, to which the above-described components have been added, drying the coating film, and heating the coating film as necessary, similarly to the method of forming the charge generation layer or the charge transport layer.

Further, even in this case, the film physical properties of the single layer type photosensitive layer can be easily enhanced by setting the work rate in the drying step performed on the coating film of a coating solution for forming a single layer type photosensitive layer to greater than 7 W. In this manner, any one or both improvement of the abrasion resistance and suppression of filming can be easily achieved.

The average thickness Dt of the single layer type photosensitive layer is 27 μm or greater and 50 μm or less, for example, preferably 31 μm or greater and 48 μm or less, more preferably 35 μm or greater and 46 μm or less, and particularly preferably 37 μm or greater and 45 μm or less.

Protective Layer

A protective layer is provided on the photosensitive layer as necessary. The protective layer is provided, for example, for the purpose of preventing a chemical change in the photosensitive layer during charging and further improving the mechanical strength of the photosensitive layer.

Therefore, for example, a layer formed of a cured film (crosslinked film) may be applied to the protective layer. Examples of these layers include the layers described in the items 1) and 2) below.

1) A layer formed of a cured film of a composition containing a reactive group-containing charge transport material having a reactive group and a charge-transporting skeleton in an identical molecule (that is, a layer containing a polymer or a crosslinked body of the reactive group-containing charge transport material)
2) A layer formed of a cured film of a composition containing a non-reactive charge transport material and a reactive group-containing non-charge transport material containing a reactive group without having a charge-transporting skeleton (that is, a layer containing the non-reactive charge transport material and a polymer or crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], $—NH_2$, —SH, —COOH, and $—SiR^{Q1}{}_{3-Qn}(OR^{Q2})_{Qn}$ [here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization and is, for example, a functional group containing a group having at least a carbon double bond. Specific examples thereof include a vinyl group, a vinyl ether group, a vinyl thioether group, a phenyl vinyl group, a vinyl phenyl group, an acryloyl group, a methacryloyl group, and a group containing at least one selected from derivatives thereof. Among these, from the viewpoint that the reactivity is excellent, for example, a vinyl group, a phenylvinyl group, a vinylphenyl group, an acryloyl group, a methacryloyl group, and a group containing at least one selected from derivatives thereof are preferable as the chain polymerizable group.

The charge-transporting skeleton of the reactive group-containing charge transport material is not particularly limited as long as the skeleton is a known structure in the electrophotographic photoreceptor, and examples thereof include a structure conjugated with a nitrogen atom, which is a skeleton derived from a nitrogen-containing positive hole-transporting compound such as a triarylamine-based compound, a benzidine-based compound, or a hydrazone-based compound. Among these, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The protective layer may also contain other known additives.

The formation of the protective layer is not particularly limited, and a known forming method is used. For example, a coating film of a coating solution for forming a protective layer in which the above-described components are added to a solvent is formed, and the coating film is dried and, as necessary, subjected to a curing treatment such as heating.

Examples of the solvent for preparing the coating solution for forming a protective layer include an aromatic solvent such as toluene or xylene; a ketone-based solvent such as methyl ethyl ketone, methyl isobutyl ketone, or cyclohexanone; an ester-based solvent such as ethyl acetate or butyl acetate; an ether-based solvent such as tetrahydrofuran or dioxane; a cellosolve-based solvent such as ethylene glycol monomethyl ether; and an alcohol-based solvent such as isopropyl alcohol or butanol. These solvents are used alone or in the form of a mixture of two or more kinds thereof.

The coating solution for forming a protective layer may be a solvent-less coating solution.

Examples of the method of coating the photosensitive layer (such as the charge transport layer) with the coating solution for forming a protective layer include typical coating methods such as a dip coating method, a push-up coating method, a wire bar coating method, a spray coating method, a blade coating method, a knife coating method, and a curtain coating method.

The thickness of the protective layer is set to, for example, preferably 1 μm or greater and 20 μm or less and more preferably 2 μm or greater and 10 μm or less.

Image Forming Apparatus and Process Cartridge

An image forming apparatus according to the present exemplary embodiment includes the electrophotographic photoreceptor, a charging unit that charges a surface of the electrophotographic photoreceptor, an electrostatic latent image forming unit that forms an electrostatic latent image on the charged surface of the electrophotographic photoreceptor, a developing unit that develops the electrostatic latent image formed on the surface of the electrophotographic photoreceptor with a developer containing a toner to form a toner image, and a transfer unit that transfers the toner image to a surface of a recording medium. Further, the electrophotographic photoreceptor according to the present exemplary embodiment is employed as the electrophotographic photoreceptor.

As the image forming apparatus according to the present exemplary embodiment, known image forming apparatuses such as an apparatus including a fixing unit that fixes the toner image transferred to the surface of a recording medium; a direct transfer type apparatus that transfers the toner image formed on the surface of the electrophotographic photoreceptor directly to the recording medium; an intermediate transfer type apparatus that primarily transfers the toner image formed on the surface of the electrophotographic photoreceptor to the surface of the intermediate transfer member and secondarily transfers the toner image transferred to the surface of the intermediate transfer member to the surface of the recording medium; an apparatus including a cleaning unit that cleans the surface of the electrophotographic photoreceptor after the transfer of the toner image and before the charging; an apparatus including a destaticizing unit that destaticizes the surface of the electrophotographic photoreceptor by irradiating the surface with destaticizing light after the transfer of the toner image and before the charging; and an apparatus including an electrophotographic photoreceptor heating member for increasing the temperature of the electrophotographic photoreceptor and decreasing the relative temperature are employed.

In a case of the intermediate transfer type apparatus, the transfer unit is, for example, configured to include an intermediate transfer member having a surface onto which the toner image is transferred, a primary transfer unit primarily transferring the toner image formed on the surface of the electrophotographic photoreceptor to the surface of the intermediate transfer member, and a secondary transfer unit secondarily transferring the toner image transferred to the surface of the intermediate transfer member to the surface of the recording medium.

The image forming apparatus according to the present exemplary embodiment may be any of a dry development type image forming apparatus or a wet development type (development type using a liquid developer) image forming apparatus.

In the image forming apparatus according to the present exemplary embodiment, for example, the portion including the electrophotographic photoreceptor may have a cartridge structure (process cartridge) that is attachable to and detachable from the image forming apparatus. As the process cartridge, for example, a process cartridge including the electrophotographic photoreceptor according to the present exemplary embodiment is preferably used. The process cartridge may include, for example, at least one selected from the group consisting of a charging unit, an electrostatic latent image forming unit, a developing unit, and a transfer unit in addition to the electrophotographic photoreceptor.

Hereinafter, an example of the image forming apparatus according to the present exemplary embodiment will be described, but the present exemplary embodiment is not limited thereto. Further, main parts shown in the figures will be described, but description of other parts will not be provided.

Figure 3:
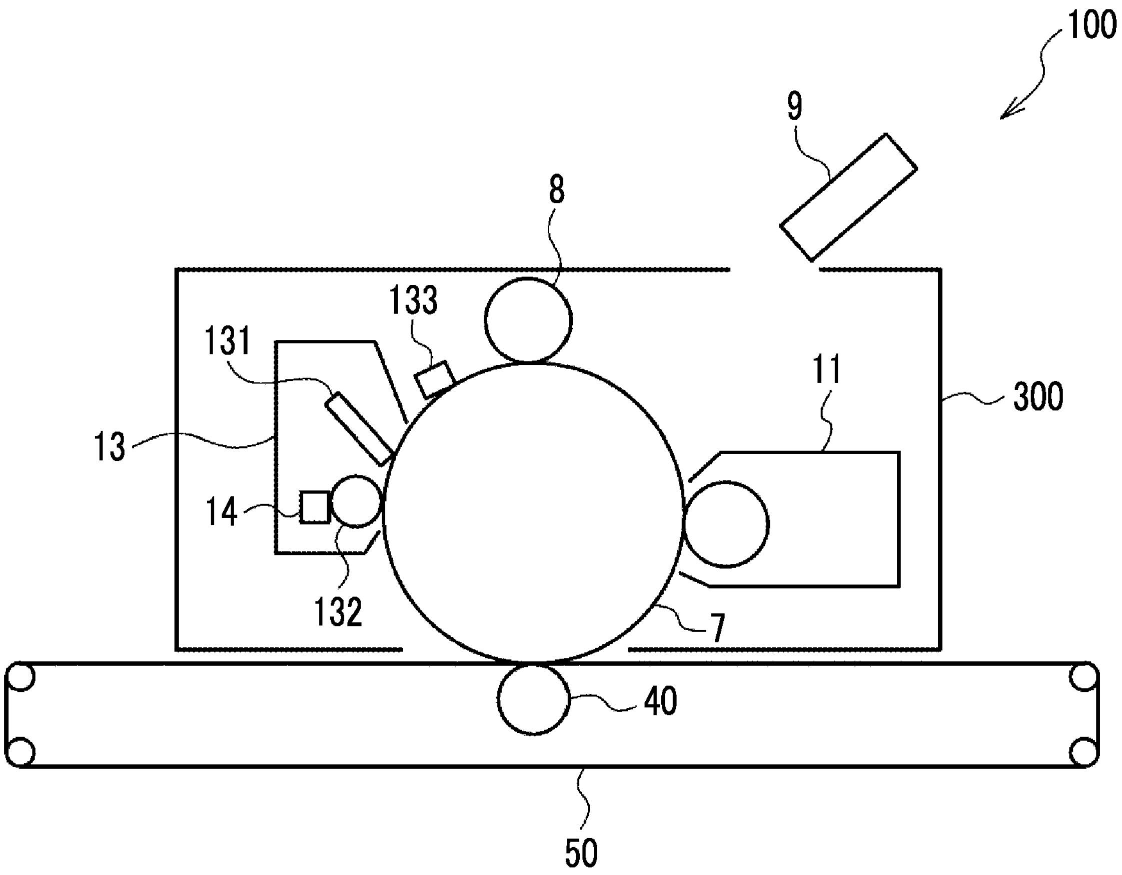
FIG. 3 is a schematic configuration view showing an example of an image forming apparatus according to the present exemplary embodiment.

FIG. 3 is a schematic configuration view showing an example of an image forming apparatus according to the present exemplary embodiment.

As shown in FIG. 3, an image forming apparatus 100 according to the present exemplary embodiment includes a process cartridge 300 including an electrophotographic photoreceptor 7, an exposure device 9 (an example of an electrostatic latent image forming unit), a transfer device 40 (primary transfer device), and an intermediate transfer member 50. In the image forming apparatus 100, the exposure device 9 is disposed at a position that can be exposed to the electrophotographic photoreceptor 7 from an opening portion of the process cartridge 300, the transfer device 40 is disposed at a position that faces the electrophotographic photoreceptor 7 via the intermediate transfer member 50, and the intermediate transfer member 50 is disposed such that a part of the intermediate transfer member 50 is in contact with the electrophotographic photoreceptor 7. Although not shown, the image forming apparatus also includes a secondary transfer device that transfers the toner image transferred to the intermediate transfer member 50 to a recording medium (for example, paper). The intermediate transfer member 50, the transfer device 40 (primary transfer device), and the secondary transfer device (not shown) correspond to an example of the transfer unit.

The process cartridge 300 in FIG. 3 integrally supports the electrophotographic photoreceptor 7, a charging device 8 (an example of the charging unit), a developing device 11 (an example of the developing unit), and a cleaning device 13 (an example of the cleaning unit) in a housing. The cleaning device 13 has a cleaning blade (an example of the cleaning member) 131, and the cleaning blade 131 is disposed to come into contact with the surface of the electrophotographic photoreceptor 7. The cleaning member may be a conductive or insulating fibrous member instead of the aspect of the cleaning blade 131, and may be used alone or in combination with the cleaning blade 131.

FIG. 3 shows an example of an image forming apparatus including a fibrous member 132 (roll shape) that supplies a lubricant 14 to the surface of the electrophotographic photoreceptor 7 and a fibrous member 133 (flat brush shape) that assists cleaning, but these are disposed as necessary.

Hereinafter, each configuration of the image forming apparatus according to the present exemplary embodiment will be described.

Charging Device

As the charging device 8, for example, a contact-type charger formed of a conductive or semi-conductive charging roller, a charging brush, a charging film, a charging rubber blade, a charging tube, or the like is used. Further, a known charger such as a non-contact type roller charger, or a scorotron charger or a corotron charger using corona discharge is also used.

Exposure Device

Examples of the exposure device 9 include an optical system device that exposes the surface of the electrophotographic photoreceptor 7 to light such as a semiconductor laser beam, LED light, and liquid crystal shutter light in a predetermined image pattern. The wavelength of the light source is within the spectral sensitivity region of the electrophotographic photoreceptor. As the wavelength of a semiconductor laser, near infrared, which has an oscillation wavelength in the vicinity of 780 nm, is mostly used. However, the wavelength is not limited thereto, and a laser having an oscillation wavelength of approximately 600 nm level or a laser having an oscillation wavelength of 400 nm or greater and 450 nm or less as a blue laser may also be used. Further, a surface emission type laser light source capable of outputting a multi-beam is also effective for forming a color image.

Developing Device

Examples of the developing device 11 include a typical developing device that performs development in contact or non-contact with the developer. The developing device 11 is not particularly limited as long as the developing device has the above-described functions, and is selected depending on the purpose thereof. Examples of the developing device include known developing machines having a function of attaching a one-component developer or a two-component developer to the electrophotographic photoreceptor 7 using a brush, a roller, or the like.

Among these, for example, a developing device formed of a developing roller having a surface on which a developer is held is preferably used.

The developer used in the developing device 11 may be a one-component developer containing only a toner or a two-component developer containing a toner and a carrier. Further, the developer may be magnetic or non-magnetic. Known developers are employed as these developers.

Cleaning Device

As the cleaning device 13, a cleaning blade type device including the cleaning blade 131 is used. In addition to the cleaning blade type device, a fur brush cleaning type device or a simultaneous development cleaning type device may be employed.

Transfer Device

Examples of the transfer device 40 include a known transfer charger such as a contact-type transfer charger using a belt, a roller, a film, a rubber blade, or the like, or a scorotron transfer charger or a corotron transfer charger using corona discharge.

Intermediate Transfer Member

As the intermediate transfer member 50, a belt-like intermediate transfer member (intermediate transfer belt) containing semi-conductive polyimide, polyamide-imide, polycarbonate, polyarylate, polyester, rubber, or the like is used. Further, as the form of the intermediate transfer member, a drum-like intermediate transfer member may be used in addition to the belt-like intermediate transfer member.

Figure 4:
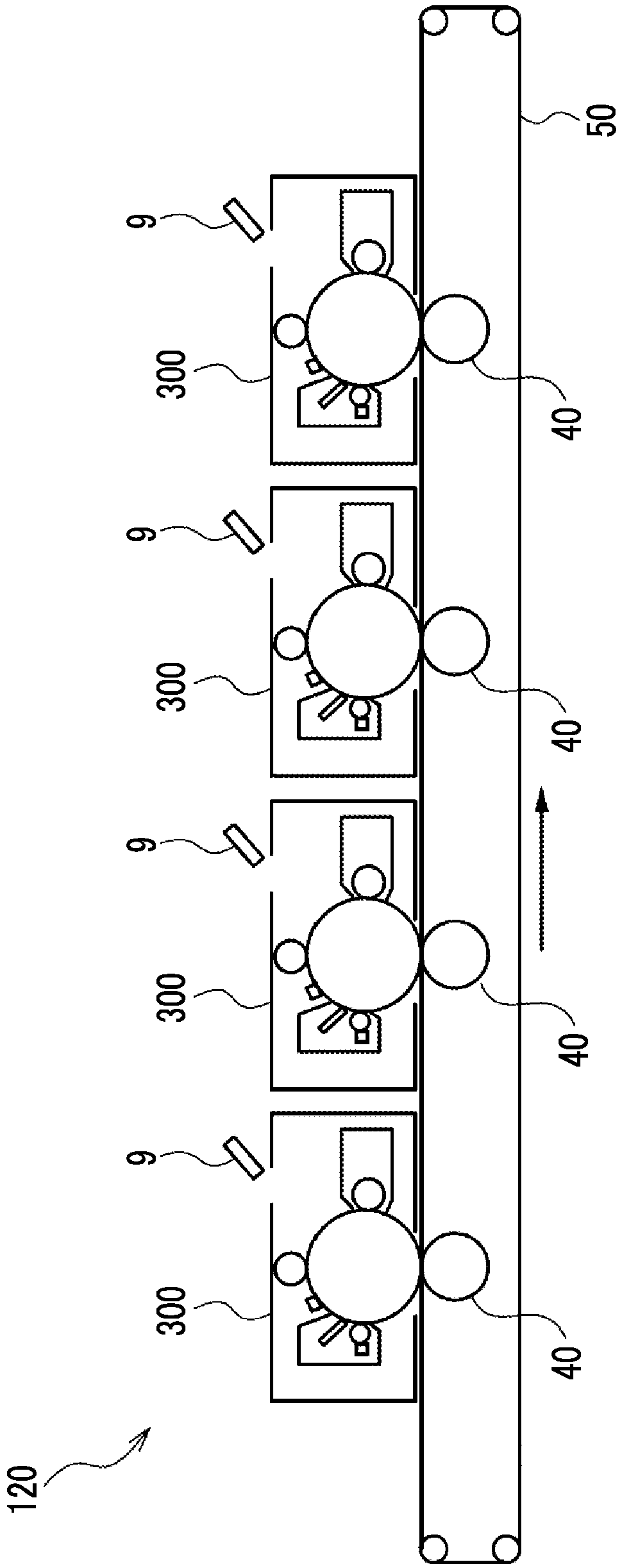
FIG. 4 is a schematic configuration view showing another example of an image forming apparatus according to the present exemplary embodiment.

FIG. 4 is a schematic configuration view showing an example of an image forming apparatus according to the present exemplary embodiment.

An image forming apparatus 120 shown in FIG. 4 is a tandem type multicolor image forming apparatus on which four process cartridges 300 are mounted. The image forming apparatus 120 is formed such that four process cartridges 300 are arranged in parallel on the intermediate transfer member 50, and one electrophotographic photoreceptor is used for each color. The image forming apparatus 120 has the same configuration as the image forming apparatus 100 except that the image forming apparatus 120 is of a tandem type.

EXAMPLES

Hereinafter, exemplary embodiments of the invention will be described in detail based on examples, but the exemplary embodiments of the invention are not limited to the examples. In the following description, "parts" and "%" are on a mass basis unless otherwise specified.

In the following description, the synthesis, the treatment, the production, and the like are carried out at room temperature (25° C.±3° C.) unless otherwise specified.

Preparation of Resin

Synthesis of Polyester Resin a 12.6373 g of 4,4'-(2-ethylhexylidene)diphenol, 0.1233 g of 4-t butylphenol, 0.0632 g of sodium hydrosulfite, and 240 mL of water are added to a reaction container equipped with a stirrer to prepare a suspension. 4.8392 g of sodium hydroxide, 0.1981 g of benzyltributylammonium chloride, and 160 mL of water are added to the suspension while being stirred at a temperature of 20° C., and the mixture is stirred for 30 minutes in a nitrogen atmosphere. 220 mL of o-dichlorobenzene is added to the aqueous solution, the solution is stirred for 30 minutes in a nitrogen atmosphere, and 12.0000 g of 4,4'-biphenyldicarbonyl chloride is added thereto in a state of powder. After completion of the addition, the reaction is allowed to proceed by stirring the solution at a temperature of 20° C. for 4 hours in a nitrogen atmosphere. The polymerized solution is diluted with 300 mL of o-dichlorobenzene to remove the water layer. After the solution is washed with a dilute acetic acid solution and ion exchange water, the solution is poured into methanol to precipitate the polymer. The precipitated polymer is separated by filtration and dried at 50° C. The polymer is redissolved in 900 mL of tetrahydrofuran, and the mixture is poured into methanol to precipitate the polymer. The precipitated polymer is separated by filtration, washed with methanol, and dried at 50° C., thereby obtaining 17.5 g of a white polymer.

The molecular weight is measured by gel permeation chromatography (GPC) using tetrahydrofuran as an eluent, and the molecular weight of the polymer is determined as the molecular weight in terms of polystyrene. The weight-average molecular weight Mw of the polymer and the molecular weight distribution Mw/Mn are listed in Table 1.

Polyester Resins b to g and C1 to C3

The polyester resins b to g and C1 to C3 are synthesized in the same manner as in the step of producing the polyester resin a except that the kind of the monomer and the amount thereof used are appropriately changed. Table 1 shows the constitutional units and the composition ratios of the polyester resins.

Polycarbonate Resin h

A polycarbonate resin (PCB-1) having the weight-average molecular weight Mw and the molecular weight distribution Mw/Mn listed in Table 1 below is prepared as the polycarbonate resin h. The polycarbonate resin (PCB-1) is a specific example of the BP polycarbonate resin described above.

"Constitutional unit: composition ratio" (for example, A2-3: 50) in the polyester resin is listed in Table 1. The composition ratio denotes the mole percent of the dicarboxylic acid unit (unit obtained by removing two OH atoms from the dicarboxylic acid of the raw material) and the mole percent of the diol unit (unit obtained by removing two H atoms from the diol of the raw material).

A2-3 and the like listed in Table 1 are specific examples of the dicarboxylic acid unit described above.

B1-2 and the like listed in Table 1 are specific examples of the diol unit described above.

TABLE 1

| | Polyester resin or polycarbonate resin | | | | |
|---|---|---|---|---|---|
| | Dicarboxylic acid unit | | Diol unit | | |
| Resin No. | Unit (A) mol % | Other units mol % | Unit (B) mol % | Mw A [×10,000] | Mw/Mn B |
| C1 | A3-2:50 | | B4-4:50 | 5 | 2.9 |
| C2 | A3-2:50 | | B4-4:50 | 43 | 2.8 |
| C3 | A1-7:50 | | B4-3:50 | 6 | 2.8 |
| a | A2-3:50 | | B1-2:50 | 11 | 2.4 |
| b | A2-3:50 | | B1-4:50 | 10 | 3.0 |
| c | A3-2:50 | | B4-4:50 | 13 | 2.7 |
| d | A2-3:50 | | B2-8:50 | 9 | 2.9 |
| e | A3-2:50 | | B1-2:50 | 12 | 2.9 |
| f | A3-2:50 | | B6-4:50 | 14 | 2.8 |
| g | A3-2:37.5 | A4-3:12.5 | B6-4:50 | 10 | 3.2 |
| h | | (PCB-1) | | 10 | 3.2 |

Production of Photoreceptor Including Lamination Type Photosensitive Layer

Example S1

Formation of Undercoat Layer

An aluminum cylindrical tube having an outer diameter of 30 mm, a length of 250 mm, and a thickness of 1 mm is prepared as a conductive substrate.

100 parts of zinc oxide (average particle diameter of 70 nm, specific surface area of 15 $m^2/g$, manufactured by Tayca Corporation) is stirred and mixed with 500 parts of toluene, 1.3 parts of a silane coupling agent (trade name: KBM603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120° C. for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50° C. for 5 hours. Thereafter, the solid content is separated by filtration by carrying out filtration under reduced pressure and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using 1 mmφ glass beads, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. The outer peripheral surface of the conductive substrate is coated with the coating solution for forming an undercoat layer by a dip coating method, and dried and cured at 170° C. for 40 minutes to form an undercoat layer. The average thickness of the undercoat layer is 25 μm.

Formation of Charge Generation Layer

A mixture consisting of 15 parts of hydroxygallium phthalocyanine as a charge generation substance (Bragg angle (2θ±0.2°) of the X-ray diffraction spectrum using Cukα characteristic X-ray has diffraction peaks at positions at least of 7.5°, 9.9°, 12.5, 16.3°, 18.6°, 25.1°, and 28.3°), 10 parts of a vinyl chloride-vinyl acetate copolymer resin (trade name: VMCH, Nippon Unicar Company Limited) as a binder resin, and 200 parts of n-butyl acetate is dispersed in a sand mill for 4 hours using glass beads having a diameter of 1 mm. 175 parts of n-butyl acetate and 180 parts of methyl ethyl ketone are added to the dispersion liquid, and the mixture is stirred, thereby obtaining a coating solution for forming a charge generation layer. The undercoat layer is immersed in and coated with the coating solution for forming a charge generation layer, and dried at room temperature (25° C.±3° C.) to form a charge generation layer having an average thickness of 0.18 μm.

Formation of Charge Transport Layer 60 parts of the polyester resin as a binder resin and 40 parts of the following structure HTM-1 as a charge transport material are dissolved in 270 parts of tetrahydrofuran and 30 parts of toluene, thereby obtaining a coating solution for forming a charge transport layer. The charge generation layer is immersed in and coated with the coating solution for forming a charge transport layer, and the obtained coating film is dried at 145° C. for 30 minutes to form a charge transport layer. Further, the work rate (W) of the coating film of the coating solution for forming a charge transport layer in the drying step is listed in Table 2. Further, the average thickness Ds (μm) of the charge transport layer is listed in Table 2.

HTM-1

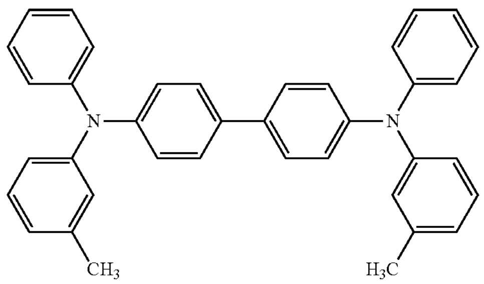

Examples S2 to S32 and Comparative Examples SC1 to SC12

Each photoreceptor is prepared in the same manner as in Example S1 except that the kind of the binder resin, the amount of the charge transport material, the average thickness Ds of the charge transport layer, the work rate during the drying step, and the like in the formation of the charge transport layer are changed to the specifications listed in Table 2.

Production of Photoreceptor Including Single Layer Type Photosensitive Layer

Example T1

Formation of Single Layer Type Photosensitive Layer 45.75 parts of the polyester resin as a binder resin, 1.25 parts of V-type hydroxygallium phthalocyanine as a charge generation material (Bragg angle (2θ±0.2°) of the X-ray diffraction spectrum using Cukα characteristic X-ray has diffraction peaks at positions of at least 7.3°, 16.0°, 24.9°, and 28.0°), 9 parts of the following structure ETM-1 as an electron transport material, 44 parts of the following structure HTM-1 as a positive-hole transport material, and 175 parts of tetrahydrofuran and 75 parts of toluene as solvents are mixed, and the mixture is subjected to a dispersion treatment in a sand mill for 4 hours using glass beads having a diameter of 1 mm, thereby obtaining a coating solution for forming a single layer type photosensitive layer.

An aluminum substrate having an outer diameter of 30 mm, a length of 244.5 mm, and a thickness of 1 mm is coated with the obtained coating solution for forming a single layer type photosensitive layer by a dip coating method, and the obtained coating film is dried and cured at a temperature of 110° C. for 40 minutes, thereby forming a single layer type photosensitive layer. Further, the work rate (W) of the coating film of the coating solution for forming a single layer type photosensitive layer in the drying step is listed in Table 3. The average thickness Dt (μm) of the single layer type photosensitive layer is listed in Table 3.

ETM-1

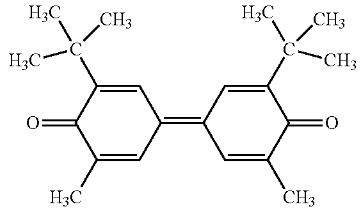

HTM-1

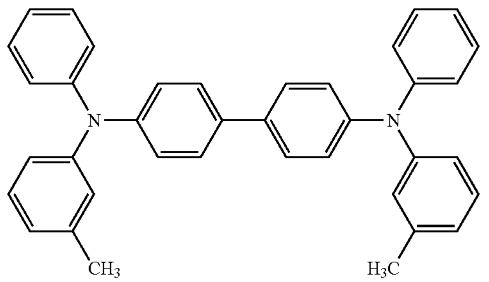

Examples T2 to T32 and Comparative Examples TC1 to TC12

Each photoreceptor is prepared in the same manner as in Example T1 except that the kind of the binder resin, the amount of the charge transport material, the average thickness Dt of the single layer type photosensitive layer, the work rate during the drying step, and the like in the formation of the single layer type photosensitive layer are changed to the specifications listed in Table 3.

Performance Evaluation of Photoreceptor

Abrasion Resistance

The photoreceptor is mounted on an electrophotographic type image forming apparatus DocuCentre f1100 (manufactured by FUJIFILM Business Innovation Corporation), and a 1% solid image as an image with an image density (area coverage) of 1% is formed on 100,000 sheets of A3 size paper in an environment of a temperature of 30° C. and a relative humidity of 85%. Thereafter, a 100% solid image as a solid image with an image density (area coverage) of 100% is formed on 100,000 sheets of A3 size paper in an environment of a temperature of 10° C. and a relative humidity of 15%. The image formation is repeated 5 times. The average thickness of the charge transport layer (or the single layer type photosensitive layer) is acquired before and after the image formation, and a difference in the average thickness before and after the image formation is defined as the amount of abrasion (nm). A Permascope (manufactured by Fisher Instruments K. K.) is used as a film thickness measuring machine.

The amount of abrasion is classified as follows. The results are listed in Tables 2 and 3.

A: The amount of abrasion is less than 500 nm.

B: The amount of abrasion is 500 nm or greater and less than 1,000 nm.

C: The amount of abrasion is 1,000 nm or greater and less than 1,500 nm.

D: The amount of abrasion is 1,500 nm or greater and less than 2,000 nm.

E: The amount of abrasion is 2,000 nm or greater.

Filming

The surface of the photoreceptor after the images are output onto 1,000,000 sheets in the image formation is image-analyzed with a bright-field image captured by an optical microscope MM-40 (manufactured by NIKON Corporation), and an area ratio (%) of the portion where the toner is accumulated (that is, a filming portion) is acquired. The results are listed in Tables 2 and 3.

Initial Image Quality And Image Quality After Traveling

The photoreceptor is installed on a drum cartridge, and the drum cartridge is mounted on an image forming apparatus ApeosPort C4300 (manufactured by FUJIFILM Business Innovation Corporation) equipped with a potential sensor, and 50% halftone images are output onto 1,000,000 sheets of A4 size paper in an environment of a temperature of 30° C. and a relative humidity of 85%. The image graininess of the first and 1,000,000th output images is observed visually and with a loupe, and the results are classified as follows. The results are listed in Tables 2 and 3.

A: Image defects are not found.

B: A trace amount of image defects is found in a case where the images are viewed with a loupe, but it is within a practically acceptable range.

C: Image defects are visually observed.

D: Image defects are visually observed in an elongated streak shape.

E: Image defects are visually observed in an elongated streak shape. Density unevenness is clearly confirmed.

TABLE 2

| | | Binder resin | | | | Average thickness of charge transport layer Ds [μm] | (A × Ds)/(Cs × 100) | Work rate during drying [W] | HM [N/mm²] | nIT [N/mm²] | Whether to satisfy Relational Equation (0) | Elastic deformation modulus [%] | Tensile elastic modulus [MPa] | Performance evaluation of photoreceptor | | | |
|---|---|---|---|---|---|---|---|---|---|---|---|---|---|---|---|---|---|
| | | Resin No. | Mw A [× 10,000] | Mw/Mn B | M1/M2 Cs | | | | | | | | | Abrasion resistance | Filming [%] | Initial image quality | Image quality after traveling |
| Comparative Example | SC1 | C1 | 5 | 2.9 | 0.40 | 35 | 4.4 | 8 | 139 | 135 | O | 44 | 2300 | C | 10 | A | B |
| | SC2 | C1 | 5 | 2.9 | 0.55 | 25 | 2.3 | 10 | 130 | 112 | X | 44 | 2200 | D | 15 | A | B |
| | SC3 | C1 | 5 | 2.9 | 0.40 | 27 | 3.4 | 7 | 130 | 110 | X | 42 | 2100 | E | 15 | A | B |
| | SC4 | C1 | 5 | 2.9 | 0.55 | 25 | 2.3 | 6 | 135 | 120 | X | 42 | 2000 | E | 20 | A | C |
| | SC5 | C2 | 43 | 2.8 | 0.40 | 35 | 37.6 | 8 | 222 | 405 | X | 71 | 5000 | A | 20 | A | B |
| | SC6 | C2 | 43 | 2.8 | 0.30 | 50 | 71.7 | 10 | 236 | 440 | X | 73 | 5100 | A | 25 | A | C |
| | SC7 | C2 | 43 | 2.8 | 0.40 | 40 | 43.0 | 7 | 226 | 470 | X | 72 | 5200 | A | 30 | A | D |
| | SC8 | C2 | 43 | 2.8 | 0.25 | 42 | 72.2 | 6 | 239 | 500 | X | 71 | 5300 | A | 40 | A | E |
| | SC9 | C3 | 6 | 2.8 | 0.28 | 50 | 10.7 | 8 | 125 | 107 | O | 42 | 2400 | C | 10 | A | B |
| | SC10 | C3 | 6 | 2.8 | 0.50 | 20 | 2.4 | 10 | 126 | 105 | X | 43 | 2300 | D | 15 | A | B |
| | SC11 | C3 | 6 | 2.8 | 0.40 | 30 | 4.5 | 7 | 125 | 100 | X | 42 | 2100 | E | 15 | A | B |
| | SC12 | C3 | 6 | 2.8 | 0.65 | 25 | 2.3 | 6 | 122 | 90 | X | 41 | 2000 | E | 20 | A | C |
| Example | S1 | a | 11 | 2.4 | 0.40 | 35 | 9.6 | 8 | 199 | 281 | O | 63 | 3300 | A | 1 | A | A |
| | S2 | a | 11 | 2.4 | 0.55 | 12 | 2.4 | 10 | 194 | 253 | O | 62 | 3100 | A | 2 | A | A |
| | S3 | a | 11 | 2.4 | 0.50 | 30 | 6.6 | 7 | 155 | 245 | O | 62 | 2900 | A | 2 | A | A |
| | S4 | a | 11 | 2.4 | 0.60 | 13 | 2.4 | 6 | 148 | 196 | O | 61 | 2800 | A | 4 | A | A |
| | S5 | b | 10 | 3.0 | 0.40 | 35 | 8.8 | 8 | 229 | 348 | O | 65 | 4100 | A | 0 | A | A |
| | S6 | b | 10 | 3.0 | 0.55 | 12 | 2.2 | 10 | 234 | 358 | O | 64 | 4000 | A | 2 | A | A |
| | S7 | b | 10 | 3.0 | 0.50 | 27 | 5.4 | 7 | 231 | 323 | O | 63 | 3900 | A | 3 | A | A |
| | S8 | b | 10 | 3.0 | 0.60 | 13 | 2.2 | 6 | 226 | 388 | O | 64 | 3800 | A | 4 | A | A |
| | S9 | c | 13 | 2.7 | 0.40 | 34 | 11.1 | 8 | 217 | 393 | O | 68 | 4800 | A | 2 | A | A |
| | S10 | c | 13 | 2.7 | 0.65 | 13 | 2.6 | 10 | 169 | 248 | O | 69 | 4600 | A | 4 | A | A |
| | S11 | c | 13 | 2.7 | 0.50 | 30 | 7.8 | 7 | 167 | 215 | O | 69 | 4200 | A | 6 | A | B |
| | S12 | c | 13 | 2.7 | 0.65 | 14 | 2.8 | 6 | 193 | 297 | O | 68 | 4400 | A | 10 | A | B |
| | S13 | d | 9 | 2.9 | 0.40 | 40 | 9.0 | 8 | 181 | 276 | O | 54 | 3000 | A | 2 | A | A |
| | S14 | d | 9 | 2.9 | 0.55 | 13 | 2.1 | 10 | 139 | 221 | O | 54 | 3100 | A | 4 | A | A |
| | S15 | d | 9 | 2.9 | 0.50 | 35 | 6.3 | 7 | 138 | 197 | O | 52 | 2900 | B | 5 | A | A |
| | S16 | d | 9 | 2.9 | 0.60 | 13 | 2.0 | 6 | 127 | 190 | O | 52 | 2800 | A | 8 | A | B |
| | S17 | e | 12 | 2.9 | 0.40 | 35 | 10.5 | 8 | 188 | 282 | O | 58 | 4500 | A | 2 | A | A |
| | S18 | e | 12 | 2.9 | 0.65 | 12 | 2.2 | 10 | 172 | 255 | O | 57 | 4600 | A | 4 | A | A |
| | S19 | e | 12 | 2.9 | 0.50 | 27 | 6.5 | 7 | 169 | 224 | O | 58 | 4400 | A | 6 | A | B |
| | S20 | e | 12 | 2.9 | 0.65 | 12 | 2.2 | 6 | 140 | 199 | O | 57 | 4400 | A | 10 | A | B |
| | S21 | f | 14 | 2.8 | 0.40 | 35 | 12.3 | 8 | 217 | 396 | O | 59 | 4400 | A | 1 | A | A |
| | S22 | f | 14 | 2.8 | 0.65 | 11 | 2.4 | 10 | 233 | 350 | O | 58 | 4300 | A | 3 | A | A |
| | S23 | f | 14 | 2.8 | 0.50 | 27 | 7.6 | 7 | 219 | 340 | O | 59 | 4300 | A | 6 | A | B |
| | S24 | f | 14 | 2.8 | 0.65 | 11 | 2.4 | 6 | 143 | 193 | O | 57 | 4200 | A | 10 | A | B |
| | S25 | g | 10 | 3.2 | 0.40 | 35 | 8.8 | 8 | 186 | 293 | O | 50 | 2700 | A | 3 | A | A |
| | S26 | g | 10 | 3.2 | 0.55 | 12 | 2.2 | 10 | 178 | 256 | O | 49 | 2400 | A | 6 | A | A |
| | S27 | g | 10 | 3.2 | 0.50 | 27 | 5.4 | 7 | 151 | 201 | O | 49 | 2600 | B | 6 | A | A |
| | S28 | g | 10 | 3.2 | 0.60 | 13 | 2.2 | 6 | 157 | 185 | O | 47 | 2500 | B | 10 | A | B |
| | S29 | h | 10 | 3.2 | 0.40 | 30 | 7.5 | 8 | 177 | 250 | O | 50 | 2700 | A | 4 | A | A |
| | S30 | h | 10 | 3.2 | 0.55 | 15 | 2.7 | 10 | 150 | 240 | O | 49 | 2400 | A | 6 | A | A |
| | S31 | h | 10 | 3.2 | 0.50 | 30 | 6.0 | 7 | 150 | 201 | O | 49 | 2600 | A | 10 | A | B |
| | S32 | h | 10 | 3.2 | 0.60 | 15 | 2.5 | 6 | 140 | 185 | O | 47 | 2500 | A | 12 | A | C |

TABLE 3

| | | Binder resin | | | | Average thickness of single layer type photosensitive layer Dt [μm] | (A × Dt)/(Ct × 100) | Work rate during drying [W] | HM [N/mm²] | nIT [N/mm²] | Whether to satisfy Relational Equation (0) | Elastic deformation modulus [%] | Tensile elastic modulus [MPa] | Performance evaluation of photoreceptor | | | |
|---|---|---|---|---|---|---|---|---|---|---|---|---|---|---|---|---|---|
| | | Resin No. | Mw A [× 10,000] | Mw/Mn B | M1/M2 Ct | | | | | | | | | Abrasion resistance | Filming [%] | Initial image quality | Image quality after traveling |
| Comparative Example | TC1 | C1 | 5 | 2.9 | 0.40 | 35 | 4.4 | 8 | 129 | 130 | O | 42 | 2100 | C | 10 | A | B |
| | TC2 | C1 | 5 | 2.9 | 0.55 | 25 | 2.3 | 10 | 129 | 130 | O | 42 | 2000 | D | 15 | A | B |
| | TC3 | C1 | 5 | 2.9 | 0.40 | 27 | 3.4 | 7 | 121 | 107 | O | 38 | 1900 | E | 15 | A | B |
| | TC4 | C1 | 5 | 2.9 | 0.55 | 25 | 2.3 | 6 | 128 | 112 | O | 38 | 1800 | E | 20 | A | C |
| | TC5 | C2 | 43 | 2.8 | 0.40 | 35 | 37.6 | 8 | 213 | 420 | X | 71 | 5000 | A | 20 | A | B |

TABLE 3-continued

| | | Binder resin: Resin No. | Binder resin: Mw A [× 10,000] | Binder resin: Mw/Mn B | Binder resin: M1/M2 Ct | Average thickness of single layer type photosensitive layer Dt [μm] | (A × Dt)/(Ct × 100) | Work rate during drying [W] | HM [N/mm$^2$] | nIT [N/mm$^2$] | Whether to satisfy Relational Equation (0) | Elastic deformation modulus [%] | Tensile elastic modulus [MPa] | Performance evaluation of photoreceptor: Abrasion resistance | Performance evaluation of photoreceptor: Filming [%] | Performance evaluation of photoreceptor: Initial image quality | Performance evaluation of photoreceptor: Image quality after traveling |
|---|---|---|---|---|---|---|---|---|---|---|---|---|---|---|---|---|---|
| | TC6 | C2 | 43 | 2.8 | 0.30 | 50 | 71.7 | 10 | 226 | 439 | X | 71 | 5100 | A | 25 | A | C |
| | TC7 | C2 | 43 | 2.8 | 0.40 | 40 | 43.0 | 7 | 225 | 462 | X | 72 | 5200 | A | 30 | A | D |
| | TC8 | C2 | 43 | 2.8 | 0.25 | 42 | 72.2 | 6 | 231 | 498 | X | 71 | 5300 | A | 40 | A | E |
| | TC9 | C3 | 6 | 2.8 | 0.28 | 50 | 10.7 | 8 | 117 | 117 | O | 41 | 2000 | C | 10 | A | B |
| | TC10 | C3 | 6 | 2.8 | 0.50 | 20 | 2.4 | 10 | 122 | 122 | O | 40 | 1900 | D | 15 | A | B |
| | TC11 | C3 | 6 | 2.8 | 0.40 | 30 | 4.5 | 7 | 119 | 120 | O | 38 | 1800 | E | 15 | A | B |
| | TC12 | C3 | 6 | 2.8 | 0.65 | 25 | 2.3 | 6 | 118 | 118 | O | 37 | 1600 | E | 20 | A | C |
| Example | T1 | a | 11 | 2.4 | 0.40 | 35 | 9.6 | 8 | 189 | 278 | O | 63 | 3600 | A | 1 | A | A |
| | T2 | a | 11 | 2.4 | 0.55 | 12 | 2.4 | 10 | 186 | 246 | O | 62 | 3600 | A | 2 | A | A |
| | T3 | a | 11 | 2.4 | 0.50 | 27 | 5.9 | 7 | 146 | 240 | O | 62 | 3500 | A | 2 | A | A |
| | T4 | a | 11 | 2.4 | 0.60 | 13 | 2.4 | 6 | 140 | 192 | O | 61 | 3500 | A | 4 | A | A |
| | T5 | b | 10 | 3.0 | 0.40 | 35 | 8.8 | 8 | 220 | 342 | O | 65 | 3700 | A | 0 | A | A |
| | T6 | b | 10 | 3.0 | 0.55 | 12 | 2.2 | 10 | 233 | 353 | O | 64 | 3600 | A | 2 | A | A |
| | T7 | b | 10 | 3.0 | 0.50 | 27 | 5.4 | 7 | 221 | 322 | O | 63 | 3500 | A | 2 | A | A |
| | T8 | b | 10 | 3.0 | 0.60 | 13 | 2.2 | 6 | 217 | 380 | O | 64 | 3600 | A | 4 | A | A |
| | T9 | c | 13 | 2.7 | 0.40 | 35 | 11.4 | 8 | 213 | 383 | O | 68 | 4200 | A | 2 | A | A |
| | T10 | c | 13 | 2.7 | 0.65 | 12 | 2.4 | 10 | 159 | 245 | O | 69 | 4200 | A | 4 | A | A |
| | T11 | c | 13 | 2.7 | 0.50 | 27 | 7.0 | 7 | 159 | 214 | O | 69 | 4000 | A | 6 | A | B |
| | T12 | c | 13 | 2.7 | 0.65 | 12 | 2.4 | 6 | 192 | 290 | O | 68 | 4200 | A | 10 | A | B |
| | T13 | d | 9 | 2.9 | 0.40 | 35 | 7.9 | 8 | 173 | 272 | O | 54 | 2900 | A | 2 | A | A |
| | T14 | d | 9 | 2.9 | 0.55 | 12 | 2.0 | 10 | 130 | 213 | O | 54 | 2900 | A | 4 | A | A |
| | T15 | d | 9 | 2.9 | 0.50 | 27 | 4.9 | 7 | 135 | 187 | O | 52 | 2700 | B | 5 | A | A |
| | T16 | d | 9 | 2.9 | 0.60 | 13 | 2.0 | 6 | 122 | 181 | O | 52 | 2700 | A | 8 | A | B |
| | T17 | e | 12 | 2.9 | 0.40 | 35 | 10.5 | 8 | 186 | 276 | O | 58 | 4200 | A | 2 | A | A |
| | T18 | e | 12 | 2.9 | 0.65 | 12 | 2.2 | 10 | 166 | 251 | O | 57 | 4100 | A | 4 | A | A |
| | T19 | e | 12 | 2.9 | 0.50 | 27 | 6.5 | 7 | 168 | 223 | O | 58 | 4000 | A | 6 | A | B |
| | T20 | e | 12 | 2.9 | 0.65 | 12 | 2.2 | 6 | 137 | 196 | O | 57 | 4000 | A | 10 | A | B |
| | T21 | f | 14 | 2.8 | 0.40 | 35 | 12.3 | 8 | 215 | 393 | O | 59 | 4300 | A | 1 | A | A |
| | T22 | f | 14 | 2.8 | 0.65 | 11 | 2.4 | 10 | 228 | 344 | O | 58 | 4300 | A | 3 | A | A |
| | T23 | f | 14 | 2.8 | 0.50 | 27 | 7.6 | 7 | 212 | 331 | O | 59 | 4100 | A | 6 | A | B |
| | T24 | f | 14 | 2.8 | 0.65 | 11 | 2.4 | 6 | 136 | 192 | O | 57 | 4000 | A | 10 | A | B |
| | T25 | g | 10 | 3.2 | 0.40 | 35 | 8.8 | 8 | 185 | 290 | O | 50 | 2500 | A | 3 | A | A |
| | T26 | g | 10 | 3.2 | 0.55 | 12 | 2.2 | 10 | 172 | 249 | O | 49 | 2400 | A | 6 | A | A |
| | T27 | g | 10 | 3.2 | 0.50 | 27 | 5.4 | 7 | 149 | 192 | O | 49 | 2300 | B | 6 | A | A |
| | T28 | g | 10 | 3.2 | 0.60 | 13 | 2.2 | 6 | 152 | 177 | O | 47 | 2300 | B | 10 | A | B |
| | T29 | h | 10 | 3.2 | 0.65 | 35 | 5.4 | 10 | 177 | 250 | O | 58 | 2900 | A | 5 | A | A |
| | T30 | h | 10 | 3.2 | 0.71 | 12 | 1.7 | 7 | 150 | 240 | O | 57 | 2600 | A | 7 | A | A |
| | T31 | h | 10 | 3.2 | 0,60 | 27 | 4.5 | 6 | 150 | 201 | O | 58 | 2800 | A | 11 | A | B |
| | T32 | h | 10 | 3.2 | 0.82 | 13 | 1.6 | 8 | 157 | 185 | O | 57 | 2500 | A | 13 | A | C |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoreceptor comprising:

a conductive substrate; and a lamination type photosensitive layer disposed on the conductive substrate and including a charge generation layer and a charge transport layer in this order, wherein the charge transport layer contains a polyester resin, wherein the polyester resin having a dicarboxylic acid unit (A) represented by Formula (A) and a diol unit (B) including at least one selected from the group consisting of a diol unit (B1) represented by Formula (B1), a diol unit (B2) represented by Formula (B2), a diol unit (B3) represented by Formula (B3), a diol unit (B5) represented by Formula (B5), a diol unit (B6) represented by Formula (B6), a diol unit (B7) represented by Formula (B7), and a diol unit (B8) represented by Formula (B8), Formula (A)

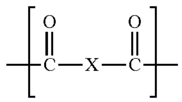

-continued

Formula (B1)

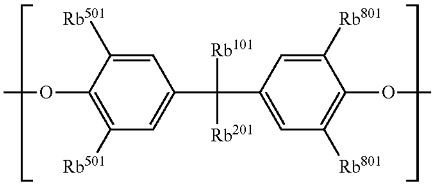

Formula (B2)

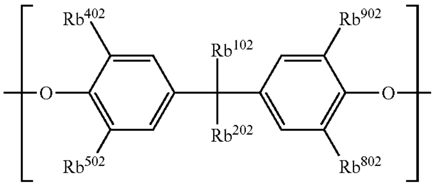

Formula (B3)

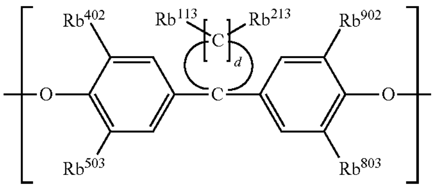

Formula (B5)

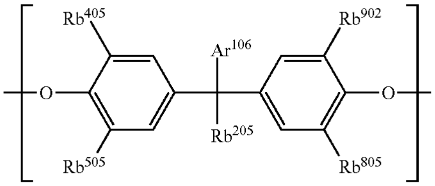

Formula (B6)

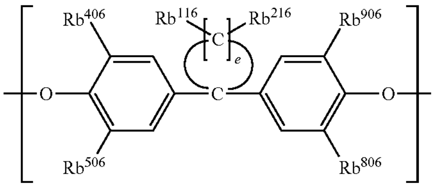

Formula (B7)

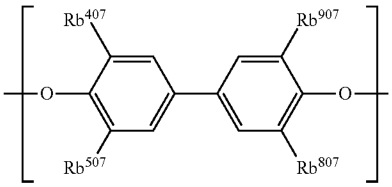

Formula (B8)

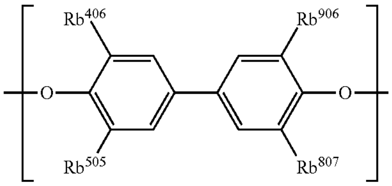

in Formula (A), X represents an organic group, in Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom, in Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom, in Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$ $Rb^{503}$ $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom, in Formula (B5), $Ar^{105}$ represents an aryl group having 6 or more and 12 or less carbon atoms or an aralkyl group having 7 or more and 20 or less carbon atoms, $Rb^{20}$) represents a hydrogen atom or an alkyl group having 1 or more and 3 or less carbon atoms, and $Rb^{405}$, $Rb^{505}$ $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom, in Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$ $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom, in Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom, in Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom, and in a case where a Martens hardness and an indentation hardness, which are acquired by an indentation test performed on the charge transport layer to a depth of 0.5 um, are respectively defined as HM ($N/mm^2$) and nIT ($N/mm^2$), Relational Equation (0) is satisfied, an elastic deformation modulus of the charge transport layer is 45% or greater and 70% or less, and a tensile elastic modulus of the charge transport layer is 2,300 MPa or greater and 5,000 MPa or less, $$nIT = a \times HM - b, \text{ wherein } a = 2 \pm 0.2, b = 100 \pm 20. \quad (0)$$

2. An electrophotographic photoreceptor comprising:

a conductive support; and a single layer type photosensitive layer disposed on the conductive support, wherein the single layer type photosensitive layer contains a polyester resin, the polyester resin having a dicarboxylic acid unit (A) represented by Formula (A) and a diol unit (B) including at least one selected from the group consisting of a diol unit (B1) represented by Formula (B1), a diol unit (B2) represented by Formula (B2), a diol unit (B3) represented by Formula (B3), a diol unit (B5) represented by Formula (B5), a diol unit (B6) represented by Formula (B6), a diol unit (B7) represented by Formula (B7), and a diol unit (B8) represented by Formula (B8), Formula (A)

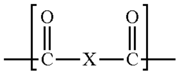

Formula (B1)

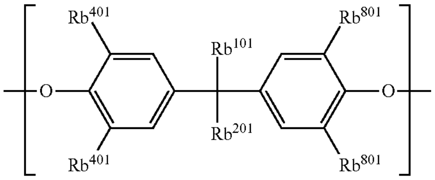

Formula (B2)

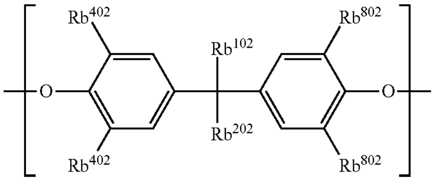

Formula (B3)

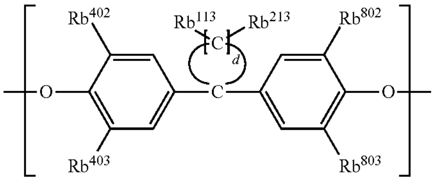

Formula (B5)

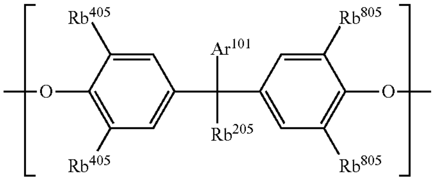

Formula (B6)

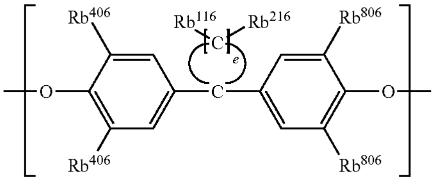

Formula (B7)

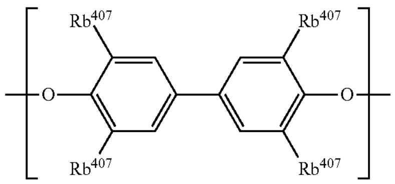

-continued

Formula (B8)

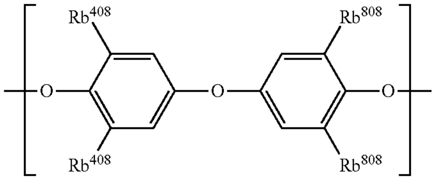

in Formula (A), X represents an organic group, in Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom, in Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$ $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom, in Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$ $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom, in Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom, in Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom, in Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom, in Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom, and in a case where a Martens hardness and an indentation hardness, which are acquired by an indentation test performed on the single layer type photosensitive layer to a depth of 0.5 um, are respectively defined as HM ($N/mm^2$) and nIT ($N/mm^2$), Relational Equation (0) is satisfied, an elastic deformation modulus of the single layer type photosensitive layer is 45% or greater and 70% or less, and a tensile elastic modulus of the single layer type photosensitive layer is 2,300 MPa or greater and 5,000 MPa or less, $$nIT = a \times HM - b, \text{ wherein } a = 2 \pm 0.2, b = 100 \pm 20). \quad (0)$$

3. The electrophotographic photoreceptor according to claim 1, wherein the charge transport layer further contains a charge transport material, and in a case where a weight-average molecular weight Mw of the polyester resin is defined as A (×10,000), a value of a ratio M1/M2 of a mass M1 of the charge transport material to a mass M2 of the charge transport layer is defined as Cs, and an average thickness of the charge transport layer is defined as Ds (μm), Expressions (1) to (4) are satisfied, (1) $5 \leq A \leq 40$, (2) $0.28 \leq Cs \leq 0.55$, (3) $27 \leq Ds \leq 50$, and (4) $2.5 \leq (A \text{ x } Ds)/(Cs \times 100) \leq 70.0$.

4. The electrophotographic photoreceptor according to claim 2, wherein the single layer type photosensitive layer further contains a charge transport material, and in a case where a weight-average molecular weight Mw of the polyester resin is defined as A (×10,000), a value of a ratio M1/M2 of a mass M1 of the charge transport material to a mass M2 of the single layer type photosensitive layer is defined as Ct, and an average thickness of the single layer type photosensitive layer is defined as Dt (um), Expressions (1) to (4) are satisfied, $$5 \leq A \leq 40 \quad (1)$$

$$0.40 \leq Ct \leq 0.60 \quad (2)$$

$$27 \leq Dt \leq 50 \quad (3)$$

$$2.5 \leq (A \times Dt)/(Ct \times 100) \leq 48.0. \quad (4)$$

5. The electrophotographic photoreceptor according to claim 1, wherein the dicarboxylic acid unit (A) is a dicarboxylic acid unit (A') represented by Formula (A'), Formula (A')

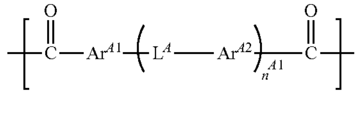

in Formula (A'), $Ar^{A1}$ and $Ar^{A2}$ each independently represent an aromatic ring that may have a substituent, $L^A$ represents a single bond or a divalent linking group, and $n^{A1}$ represents 0, 1, or 2.

6. The electrophotographic photoreceptor according to claim 2, wherein the dicarboxylic acid unit (A) is a dicarboxylic acid unit (A') represented by Formula (A'), Formula (A')

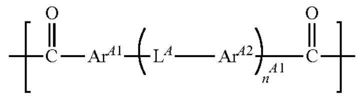

in Formula (A'), $Ar^{A1}$ and $Ar^{A2}$ each independently represent an aromatic ring that may have a substituent, $L^A$ represents a single bond or a divalent linking group, and $n^{A1}$ represents 0, 1, or 2.

7. The electrophotographic photoreceptor according to claim 1, wherein the dicarboxylic acid unit (A) includes at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented Formula (A4), Formula (A1)

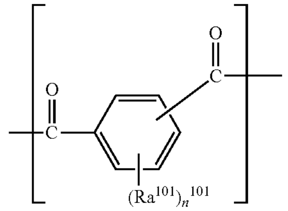

Formula (A2)

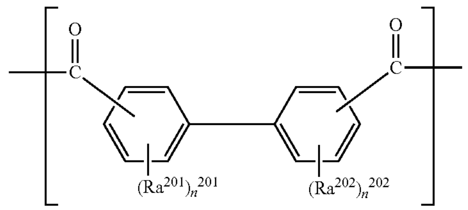

Formula (A3)

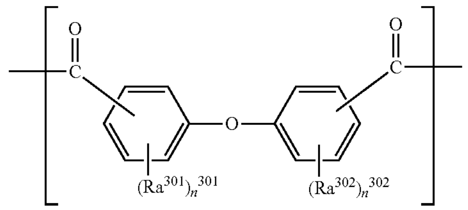

Formula (A4)

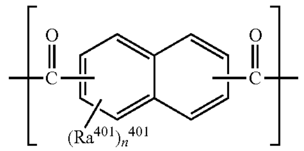

in Formula (A1), $n^{101}$ represents an integer of 0 or greater and 4 or less, and $Ra^{101}$ each independently represent an alkyl group having 1 or more and 10 or less carbon atoms, an aryl group having 6 or more and 12 or less carbon atoms, or an alkoxy group having 1 or more and 6 or less carbon atoms, in Formula (A2), $n^{201}$ and $n^{202}$ each independently represent an integer of 0 or greater and 4 or less, and $Ra^{201}$ and $Ra^{202}$ each independently represent an alkyl group having 1 or more and 10 or less carbon atoms, an aryl group having 6 or more and 12 or less carbon atoms, or an alkoxy group having 1 or more and 6 or less carbon atoms, in Formula (A3), $n^{301}$ and $n^{302}$ each independently represent an integer of 0 or greater and 4 or less, and $Ra^{301}$ and $Ra^{302}$ each independently represent an alkyl group having 1 or more and 10 or less carbon atoms, an aryl group having 6 or more and 12 or less carbon atoms, or an alkoxy group having 1 or more and 6 or less carbon atoms, in Formula (A4), $n^{401}$ represents an integer of 0 or greater and 6 or less, and $Ra^{401}$ each independently represent an alkyl group having 1 or more and 10 or less carbon atoms, an aryl group having 6 or more and 12 or less carbon atoms, or an alkoxy group having 1 or more and 6 or less carbon atoms.

8. The electrophotographic photoreceptor according to claim 3, wherein an expression of $3.6 \leq (A \times Ds)/(Cs \times 100) \leq 46.0$ is satisfied.

9. The electrophotographic photoreceptor according to claim 4, wherein an expression of $3.5 \leq (A \times Dt)/(Ct \times 100) \leq 40.0$ is satisfied.

10. The electrophotographic photoreceptor according to claim 3, wherein an expression of $30 \leq Ds \leq 48$ is satisfied.

11. The electrophotographic photoreceptor according to claim 4, wherein an expression of $30 \leq Dt \leq 48$ is satisfied.

12. The electrophotographic photoreceptor according to claim 3, wherein an expression of $6 \leq A \leq 30$ is satisfied.

13. A process cartridge comprising:

the electrophotographic photoreceptor according to claim 1, wherein the process cartridge is attachable to and detachable from an image forming apparatus.

14. An image forming apparatus comprising:

the electrophotographic photoreceptor according to claim 1;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

* * * * *